US009600319B2

United States Patent
Morita et al.

(10) Patent No.: US 9,600,319 B2
(45) Date of Patent: Mar. 21, 2017

(54) COMPUTER-READABLE MEDIUM, APPARATUS, AND METHOD FOR OFFLOADING PROCESSING FROM A VIRTUAL SWITCH TO A PHYSICAL SWITCH

(71) Applicant: FUJITSU LIMITED, Kawasaki-shi, Kanagawa (JP)

(72) Inventors: Mayuko Morita, Yokohama (JP); Susumu Watanabe, Yokohama (JP); Hajime Hoashi, Numazu (JP); Hiroshi Takamure, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/503,543

(22) Filed: Oct. 1, 2014

(65) Prior Publication Data
US 2015/0100962 A1 Apr. 9, 2015

(30) Foreign Application Priority Data

Oct. 4, 2013 (JP) .................................. 2013-209663

(51) Int. Cl.
*G06F 9/455* (2006.01)
*H04L 12/46* (2006.01)
(Continued)

(52) U.S. Cl.
CPC ...... *G06F 9/45558* (2013.01); *H04L 12/4641* (2013.01); *H04L 67/00* (2013.01);
(Continued)

(58) Field of Classification Search
CPC ............. G06F 9/45558; G06F 9/45533; G06F 2009/45595; H04L 12/4641; H04L 67/00; H04L 49/15; H04L 49/70; H04L 49/351
See application file for complete search history.

(56) References Cited

U.S. PATENT DOCUMENTS 6,625,143 B1 * 9/2003 Kamiya .............. H04M 3/4228
370/360
8,199,672 B1 * 6/2012 Nachum ............. H04L 12/4013
370/254
(Continued)

FOREIGN PATENT DOCUMENTS

JP 2007-109040 4/2007
JP 2007-272628 10/2007
(Continued)

OTHER PUBLICATIONS

Kashyap, V., et al., Automating Virtual Machine Network Profiles, Proceedings of the Linux Symposium, Jul. 2010, 8 pages, [retrieved on Jan. 7, 2016], Retrieved from the Internet: <URL:https://landley.net/kdocs/ols/2010/ols2010-pages-147-152.pdf>.*
(Continued)

*Primary Examiner* — Geoffrey St Leger
(74) *Attorney, Agent, or Firm* — Staas & Halsey LLP

(57) ABSTRACT

A non-transitory computer-readable medium including a program, which when executed by a computer, causes the computer to execute a process including obtaining first information indicating a load in the computer, second information indicating a first amount of communication handled by a virtual switch executed in the computer, and third information indicating a second amount of communication between the computer and another computer; and determining whether to switch from a first mode, in which the virtual machine executes a switch operation, to a second mode, in which the virtual switch and a physical switch that relays a communication of the computer cooperatively execute the switch operation, on the basis of the first information, the second information and the third information.

9 Claims, 18 Drawing Sheets

(51) Int. Cl.
 *H04L 12/931* (2013.01)
 *H04L 29/08* (2006.01)
(52) U.S. Cl.
 CPC ............ *G06F 9/45533* (2013.01); *G06F 2009/45595* (2013.01); *H04L 49/351* (2013.01); *H04L 49/70* (2013.01)

(56) References Cited

U.S. PATENT DOCUMENTS

| | | | | |
|---|---|---|---|---|
| 8,386,642 | B2* | 2/2013 | Elzur | H04L 41/0213 709/241 |
| 8,589,919 | B2* | 11/2013 | Smith | G06F 9/45533 718/1 |
| 8,863,124 | B1* | 10/2014 | Aron | G06F 9/45533 709/223 |
| 8,914,546 | B2* | 12/2014 | Kawamoto | G06F 9/5088 709/250 |
| 8,989,187 | B2* | 3/2015 | Saraiya | H04L 61/2596 370/392 |
| 2007/0088829 | A1 | 4/2007 | Shima et al. | |
| 2007/0233892 | A1 | 10/2007 | Ueno | |
| 2010/0223397 | A1* | 9/2010 | Elzur | H04L 41/0213 709/235 |
| 2010/0275199 | A1* | 10/2010 | Smith | G06F 9/45533 718/1 |
| 2011/0202920 | A1 | 8/2011 | Takase | |
| 2011/0299537 | A1* | 12/2011 | Saraiya | H04L 61/2596 370/392 |
| 2012/0254445 | A1* | 10/2012 | Kawamoto | G06F 9/5088 709/226 |
| 2012/0254863 | A1* | 10/2012 | Baratakke | G06F 9/45533 718/1 |
| 2012/0291029 | A1* | 11/2012 | Kidambi | H04L 49/70 718/1 |
| 2013/0132952 | A1* | 5/2013 | Shah | G06F 9/45558 718/1 |
| 2013/0138836 | A1* | 5/2013 | Cohen | H04L 49/351 709/250 |
| 2013/0152075 | A1* | 6/2013 | Cardona | G06F 9/45558 718/1 |
| 2013/0219391 | A1* | 8/2013 | Lee | G06F 9/45533 718/1 |
| 2013/0346583 | A1* | 12/2013 | Low | H04L 12/4641 709/223 |
| 2014/0149985 | A1* | 5/2014 | Takeuchi | G06F 9/45558 718/1 |

FOREIGN PATENT DOCUMENTS

| | | |
|---|---|---|
| JP | 2011-171874 | 9/2011 |
| JP | 2012-239075 | 12/2012 |

OTHER PUBLICATIONS

Tseng, H-M., et al., Network Virtualization with Cloud Virtual Switch, IEEE 17th International Conference on Parallel and Distributed Systems (ICPADS), 2011, pp. 998-1003, [retrieved on Aug. 22, 2016], Retrieved from the Internet: <URL:http://ieeexplore.ieee.org/>.*

Ohkawara, "Fujitsu Develops Technology for Offloading Virtual Switch Functions on Server to 10 GbE Switch", Impress Watch Corporation, Online Article, Jun. 10, 2010, 4 pages, searched on Apr. 18, 2013, <URL: http://cloud.watch.impress.co.jp/docs/event/20100610_373167.html>.

* cited by examiner

FIG. 6

| VIRTUAL SWITCH MONITORING AND SETTING TABLE | | | 111 |
|---|---|---|---|
| PARAMETER NAME | VALUE | DETAIL | |
| perf_interval_hv_cpu | 30 | MIB ACQUISITION INTERVAL (SECONDS) | |
| perf_time_hv_cpu | 300 | LOAD CALCULATION INTERVAL (SECONDS) | |
| perf_offload_avg_cpu | 95 | HV'S CPU UTILIZATION THRESHOLD (%) | |
| perf_offload_avg_io | 30 | VIRTUAL SWITCH LOAD THRESHOLD (%) | |

FIG. 8

| SERVER MEASUREMENT TABLE | | | | 113 |
|---|---|---|---|---|
| MEASUREMENT NUMBER | HV'S CPU UTILIZATION (%) | AMOUNT (BYTES) OF COMMUNICATION BETWEEN VIRTUAL MACHINES | TOTAL COMMUNICATION AMOUNT (BYTES) | |
| FIRST | 96 | 1234 | 5678 | |
| SECOND | 95 | 9012 | 34567 | |
| ... | ... | ... | ... | |
| TENTH | 94 | 8901 | 12345 | |

FIG. 9

| PHYSICAL SWITCH MEASUREMENT TABLE | 114 |
|---|---|
| MEASUREMENT NUMBER | PHYSICAL SWITCH LOAD (%) |
| FIRST | 20 |
| SECOND | 25 |
| ... | ... |
| TENTH | 15 |

FIG. 18A

| ITEM | MIB INFORMATION |
|---|---|
| LOAD OF SERVER | LOAD, CAUSED BY HYPERVISOR, OF SERVER |
| AMOUNT OF COMMUNICATION HANDLED BY VIRTUAL SWITCH | AMOUNT OF COMMUNICATION BETWEEN VIRTUAL MACHINES |
| AMOUNT OF COMMUNICATION BETWEEN SERVER AND EXTERNAL DEVICE | AMOUNT OF COMMUNICATION BETWEEN SERVER AND EXTERNAL DEVICE THROUGH VIRTUAL SWITCH |

FIG. 18B

| ITEM | MIB INFORMATION |
|---|---|
| LOAD OF SERVER | LOAD, CAUSED BY HYPERVISOR, OF SERVER |
| AMOUNT OF COMMUNICATION HANDLED BY VIRTUAL SWITCH | AMOUNT OF COMMUNICATION BETWEEN VIRTUAL MACHINES |
| AMOUNT OF COMMUNICATION BETWEEN SERVER AND EXTERNAL DEVICE | TOTAL AMOUNT OF COMMUNICATION THROUGH VIRTUAL SWITCH (COMMUNICATION AMOUNT OBTAINED BY SUBTRACTING AMOUNT OF COMMUNICATION BETWEEN VIRTUAL MACHINES FROM TOTAL COMMUNICATION AMOUNT CORRESPONDS TO AMOUNT OF COMMUNICATION BETWEEN SERVER AND EXTERNAL DEVICE) |

COMPUTER-READABLE MEDIUM, APPARATUS, AND METHOD FOR OFFLOADING PROCESSING FROM A VIRTUAL SWITCH TO A PHYSICAL SWITCH

CROSS-REFERENCE TO RELATED APPLICATION

This application is based upon and claims the benefit of priority of the prior Japanese Patent Application No. 2013-209663 filed on Oct. 4, 2013, the entire contents of which are incorporated herein by reference.

FIELD

The embodiments discussed herein are related to a computer-readable medium, an apparatus, and a method.

BACKGROUND

Currently, in the information processing field, a virtualization technique for executing multiple virtual computers (hereinafter referred to as virtual machines or logical hosts in some cases) on a physical computer (hereinafter referred to as a physical machine or a physical host in some cases) is used. On each of the virtual machines, software such as an operating system (OS) may be executed. The physical machine that uses the virtualization technique executes software for managing the multiple virtual machines.

For example, software that is referred to as a hypervisor may assign, as arithmetic resources, the processing capacity of a central processing unit (CPU) and storage regions of a random access memory (RAM) to the multiple virtual machines. In addition, the hypervisor may execute, on the physical machine, a function (hereinafter referred to as a virtual switch in some cases) of relaying communication of the virtual machines.

A load to be applied due to a process executed by software may be reduced by causing hardware to execute a part of the software process (this operation is referred to as offloading in some cases). For example, there is a proposal in which a requirement for switching to a software process is set to ensure that a process is switched to the software process that is executed on a part to be inspected in detail by software. In this proposal, a desired part in a single application session is processed by the software and the other part is processed by hardware. In addition, processes (for example, Quality of Service (QoS), filtering, and the like) of a virtual switch may be offloaded to an external physical switch.

Examples of related art are Japanese Laid-open Patent Publication No. 2007-272628 and "Katsuyuki OHKAWARA, "Fujitsu Develops Technology for Offloading Virtual Switch Functions on Server to 10 GbE Switch", online, Jun. 10, 2010, Impress Watch Corporation, "searched on Apr. 18, 2013", on the Internet.

SUMMARY

According to an aspect of the invention, a non-transitory computer-readable medium including a program, which when executed by a computer, causes the computer to execute a process including obtaining first information indicating a load in the computer, second information indicating a first amount of communication handled by a virtual switch executed in the computer, and third information indicating a second amount of communication between the computer and another computer; and determining whether switches from a first mode, in which the virtual machine executes a switch operation, to a second mode, in which the virtual machine and a physical switch that relays a communication of the computer cooperatively execute the switch operation, on the basis of the first information, the second information and the third information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a virtual switch monitoring and setting table;

FIG. 8 is a diagram illustrating an example of a server measurement table;

FIG. 9 is a diagram illustrating an example of a physical switch measurement table;

FIGS. 18A and 18B are diagrams illustrating examples of information to be acquired.

DESCRIPTION OF EMBODIMENTS

First, a consideration made by the inventors is explained below. A process load of a virtual switch may be reduced by offloading a process from the virtual switch to a physical switch. However, when the process load of the virtual switch is low, processing performance is expected to be improved by avoiding offloading the process to the physical switch and causing the virtual switch to execute the process. Thus, it is requested to determine whether or not the offloading of the process from the virtual switch to the physical switch is to be executed and dynamically switch between the execution and non-execution of the offloading, for example.

Specifically, in order to determine whether or not the execution of the offloading from the virtual switch to the physical switch is to be executed, it is requested to determine whether or not the process load of the virtual switch is to be reduced, determine how much the amount of communication that applies a process load to the virtual switch is, and determine whether or not the offloading from the virtual switch to the physical switch is to be executed, for example.

However, even if information of a process load of a physical machine executing the virtual switch and the amount of communication executed by the physical machine is simply acquired and referenced, the information may not be suitable to appropriately determine whether or not the offloading from the virtual switch to the physical switch is to be executed.

According to first and second embodiments described below, the execution of offloading of switch processes from a virtual switch to a physical switch may be controlled based on a process load of the virtual switch.

Hereinafter, the embodiments are described with reference to the accompanying drawings.

First Embodiment

Figure 1:
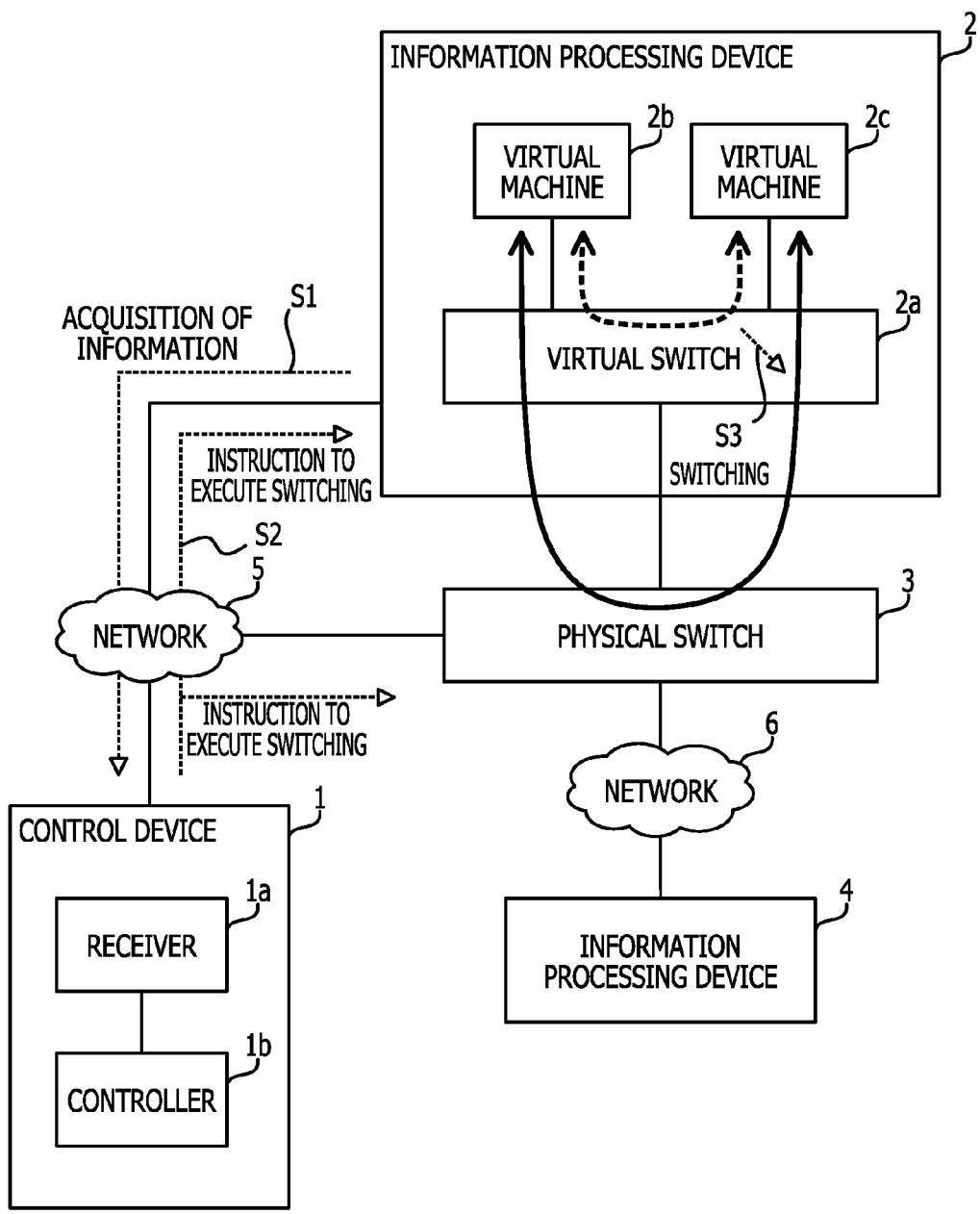
FIG. 1 is a diagram illustrating an information processing system according to a first embodiment.

FIG. 1 is a diagram illustrating an information processing system according to the first embodiment. The information processing system according to the first embodiment includes a control device 1, information processing devices 2 and 4, and a physical switch 3. The information processing device 2 is directly or indirectly connected to the physical switch 3. For example, the information processing device 2 and the physical switch 3 are directly connected to each other through a certain cable. Alternatively, the information processing device 2 and the physical switch 3 may be indirectly connected to each other through another device that is a repeater or a repeater hub and arranged between the information processing device 2 and the physical switch 3. The control device 1, the information processing device 2, and the physical switch 3 are connected to a network 5. The physical switch 3 and the information processing device 4 are connected to a network 6.

A virtual switch 2a and virtual machines 2b and 2c may be executed on the information processing device 2. For example, a hypervisor that is executed by the information processing device 2 may achieve a function of the virtual switch 2a. In addition, the hypervisor may assign resources of the information processing device 2 to the virtual machines 2b and 2c.

The physical switch 3 relays communication between the information processing devices 2 and 4. The physical switch 3 may be a relay device that relays communication on a second layer (layer 2 (L2)) and a third layer (layer 3 (L3)) of the Open Systems Interconnection (OSI) reference model.

The information processing system according to the first embodiment may switch between a first mode in which the virtual switch 2a executes switch processes between the virtual machines 2b and 2c and a second mode in which the virtual switch 2a and the physical switch 3 interoperate with each other so as to execute the switch processes. For example, the switch processes includes transfer of communication data, QoS, filtering (for example, a security function using an access control list (ACL)), and mirroring.

The information processing system according to the first embodiment migrates the switch processes from the virtual switch 2a to the physical switch 3, causes the virtual switch 2a and the physical switch 3 to interoperate with each other so as to execute the switch processes, and thereby reduces a load of the information processing device 2 (offloading). A state in the first mode is referred to as an offloading released state, while a state in the second mode is referred to as an offloading state.

The control device 1 includes a receiver is and a controller 1b. The controller 1b may include a CPU, a digital signal processor (DSP), an application specific integrated circuit (ASIC), and a field programmable gate array (FPGA). The controller 1b may be a processor configured to execute a program. The "processor" may be a group (multiprocessor) of multiple processors. The control device 1 may be an information processing device such as a computer that includes the processor and a memory such as a RAM.

The receiver is acquires, from the information processing device 2, information of the load of the information processing device 2, a first communication amount of communication handled by the virtual switch 2a, and a second communication amount of communication between the information processing device 2 and another device (for example, the information processing device 4). If the information processing device 2 communicates with a plurality of other devices, the second communication amount is a total of amounts of communication between the information processing device 2 and the plurality of other devices. For example, the receiver is causes the acquired information to be stored in a storage unit (for example, the RAM, a hard disk drive (HDD), or the like) included in the control device 1.

The controller 1b determines, based on the acquired information of the load of the information processing device 2, the first communication amount, and the second communication amount, whether or not switching from the first mode to the second mode is to be executed. For example, if the load of the information processing device 2 is relatively large (or is, for example, equal to or higher than a first threshold), and a ratio of the first communication amount to the total of the first and second communication amounts is relatively large (or is, for example, equal to or larger than a second threshold), the controller 1b may determine that the switching from the first mode to the second mode is to be executed.

This is due to the fact that if the load of the information processing device 2 is relatively large, and the ratio of the amount of communication handled by the virtual switch 2a to the total amount of communication by the information processing device 2 is relatively large, the information processing device 2 may estimate that a load caused by a process of the virtual switch 2a is relatively large. In this case, the load of the information processing device 2 is highly likely to be reduced by executing the offloading.

In this case, if the load of the information processing device 2 is relatively low (or is, for example, lower than the first threshold) or the ratio of the first communication amount to the total of the first and second communication amounts is relatively small (or is, for example, smaller than the second threshold), the controller 1b may determine that the switching from the first mode to the second mode is not to be executed.

This is due to the fact that if the load of the information processing device 2 is relatively low, an arithmetic resource of the information processing device 2 may be available. In addition, this is due to the fact that if the ratio of the amount of communication handled by the virtual switch 2a to the total amount of communication by the information processing device 2 is relatively small, the information processing device 2 may estimate that the load caused by the process of the virtual switch 2a is relatively low. In this case, the offloading may not be executed.

The controller 1b acquires information from the information processing device 2 (in step S1). After the controller 1b determines, based on the acquired information, that the switching from the first mode to the second mode is to be executed, the controller 1b may instruct the information processing device 2 and the physical switch 3 to execute the switching (in step S2). The information processing device 2 and the physical switch 3 switch from the first mode to the second mode in accordance with the instruction (in step S3).

In the control device 1, the receiver is acquires, from the information processing device 2, information of the load of the information processing device 2, the first amount of the communication handled by the virtual switch 2a, the second amount of the communication between the information processing device 2 and the other device. The controller 1b determine, based on the acquired information of the load of the information processing device 2, the first communication amount, and the second communication amount, whether or not the switching from the first mode to the second mode is to be executed.

Thus, information that represents an estimated process load of the virtual switch 2a may be acquired, and the mode switching may be executed based on the acquired information. Specifically, for example, if a function of the virtual switch 2a is a part of functions of the hypervisor, which ratio of a load caused by the hypervisor is caused by the process of the virtual switch 2a may not be identified and only a load of the virtual switch 2a may not be measured. In addition, even if the process load of the information processing device 2 on which the virtual switch 2a is executed and the amount of communication by the information processing device 2 are simply acquired and referenced, it is difficult to recognize the process load of the virtual switch 2a.

Thus, the control device 1 acquires, from the information processing device 2, the information of the load of the information processing device 2, the first communication amount of the communication handled by the virtual switch 2a, and the second communication amount of the communication between the information processing device 2 and the other device. If the control device 1 uses the information, the control device 1 may appropriately detect a case where the load of the information processing device 2 is estimated to be relatively high and the load of the virtual switch 2a is estimated to be relatively high, and the control device 1 may switch the first mode to the second mode.

The reason for considering the load of the information processing device 2 is that even if the ratio of the amount of the communication handled by the virtual switch 2a is relatively large, the load of the information processing device 2 may not be high. Specifically, the execution of the mode switching is suppressed even if the load of the information processing device 2 is relatively low.

The receiver is may acquire, as the load of the information processing device 2, a load caused by a process of the hypervisor that executes the virtual switch 2a. For example, if the controller 1b determines that the load caused by the process of the hypervisor is relatively high and the ratio of the amount of the communication handled by the virtual switch 2a to the amount of the communication executed by the information processing device 2 is relatively large, the controller 1b determines that the switching is to be executed. Thus, if it is estimated that a main cause of the load of the information processing device 2 is highly likely to be the process of the virtual switch 2a, the mode switching may be executed, for example.

In addition, the receiver is may acquire, as the first communication amount, information that has been further narrowed down. The receiver is may acquire, as the first communication amount, the amount of communication executed through the virtual switch 2a between multiple virtual machines (for example, the virtual machines 2b and 2c) executed on the information processing device 2. This is due to the fact that if the ratio of the amount of the communication between the virtual machines to the amount of the communication executed by the information processing device 2 is relatively large, the frequencies of processes, including data transfer by the virtual switch 2a and QoS by the virtual switch 2a, to be offloaded are estimated to become high and the load of the information processing device 2 is thereby estimated to become high. In this case, the load of the information processing device 2 is highly likely to be reduced by the offloading.

In addition, the receiver is may continuously acquire the load of the information processing device 2, a load of the physical switch 3, and communication amounts after the switching to the second mode. Then, the controller 1b may determine, based on the load of the information processing device 2 and the load of the physical switch 3, whether or not switching from the second mode to the first mode (release of the offloading state) is to be executed. This is due to the fact that if the load of the physical switch 3 is relatively high and the load of the information processing device 2 is relatively low after the offloading, performance may be improved by switching from the second mode to the first mode, for example.

The receiver 1a may use Simple Network Management Protocol (SNMP) to acquire information of the loads and the communication amounts from the information processing device 2 and the physical switch 3, for example. Thus, the information may be efficiently collected from the information processing device 2 and the physical switch 3 by a common method.

Furthermore, the processes that are executed by the control device 1 may be achieved by the information processing device 2. Specifically, the processes that are executed by the control device 1 and processes that are executed by the information processing device 2 may be executed by hardware of the single information processing device 2. In this case, a controller (for example, a processor) that is included in the information processing device 2 executes the same processes as the controller 1b based on information acquired from the virtual switch 2a and the physical switch 3.

Second Embodiment

Figure 2:
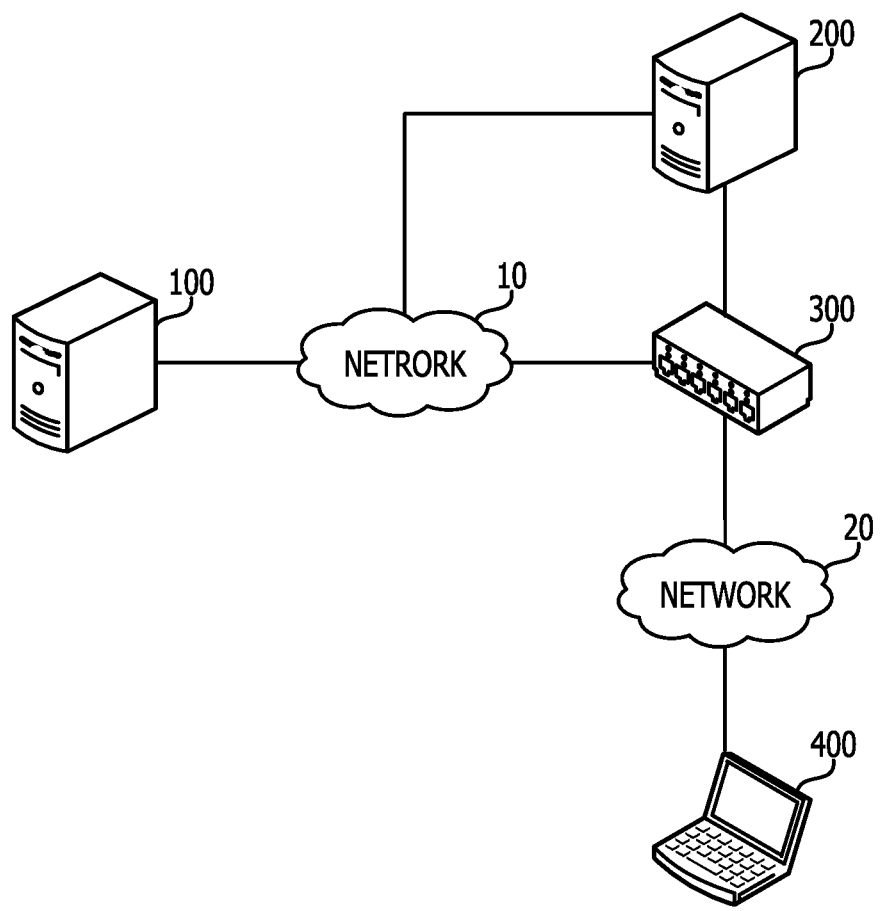
FIG. 2 is a diagram illustrating an information processing system according to a second embodiment.

FIG. 2 is a diagram illustrating an information processing system according to the second embodiment. The information processing system according to the second embodiment includes a control server 100, a server 200, a switch 300, and a client 400. The control server 100, the server 200, and the switch 300 are connected to a network 10. The server 200 is connected to the switch 300 through a certain cable. The switch 300 and the client 400 are connected to a network 20. The networks 10 and 20 are, for example, local area networks (LANs). The networks 10 and 20 may be broadband networks such as wide area networks or the Internet. The network 10 may be a network for operations and management.

The control server 100 is a server computer configured to operate and manage the server 200 and the switch 300. The control server 100 collects information for management from the server 200 and the switch 300. SNMP may be used for the collection of the information. SNMP is a protocol to be used to acquire information for management. The control server 100 functions as a manager, while the server 200 and the switch 300 function as agents. The control server 100

(manager) collects predetermined information from a management information group managed by the server 200 (agent) and the switch 300 (agent). The management information group is referred to as a message information base (MIB).

In addition, the control server 100 controls offloading of the server 100. Specifically, the server 200 migrates functions of a virtual switch executed on the server 200 to the switch 300. The functions of the virtual switch are data transfer, QoS, filtering, and the like. The offloading using the physical switch (switch 300) may be achieved using a method that is referred to as Virtual Ethernet Port Aggregator (VEPA) (Ethernet is a registered trademark), for example.

The server 200 is a server computer configured to execute a hypervisor and a plurality of virtual machines. The hypervisor assigns resources such as a CPU and RAM of the server 200 to the plurality of virtual machines. The hypervisor has a function of relaying communication between the virtual machines and communication between the virtual machines and another device (for example, the client 400).

The switch 300 is a relay device configured to relay communication between the server 200 and another device (for example, the client 400). The switch 300 is a L2 switch configured to relay communication on the second layer of the OSI reference model. The switch 300, however, may relay communication on another layer. For example, the switch 300 may be a L3 switch or a router.

The client 400 is a client computer to be used by a user. For example, the user uses the client 400 to receive various services provided by the virtual machines executed on the server 200. Other multiple clients may be connected to the network 20. The virtual machines on the server 200 may be accessed from the multiple clients.

Figure 3:
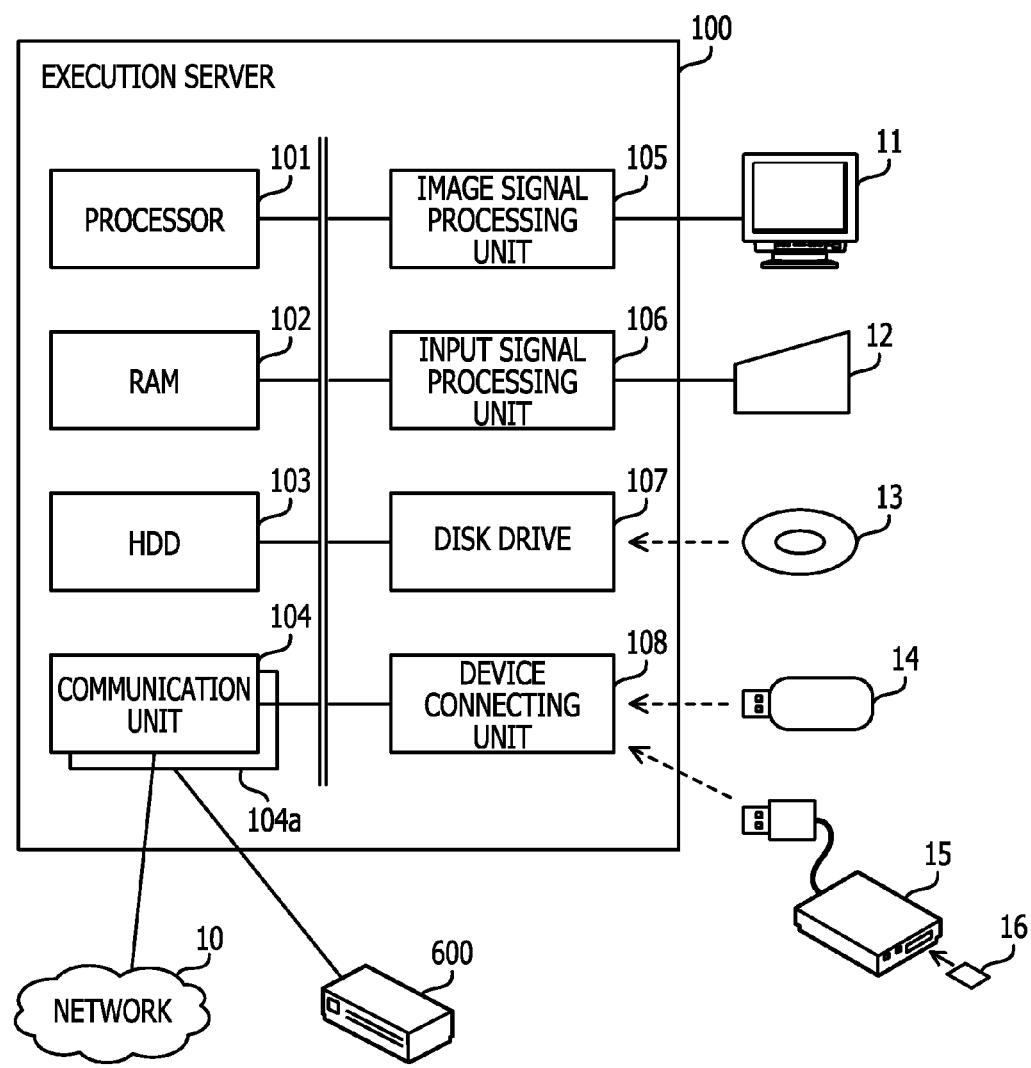
FIG. 3 is a diagram illustrating an example of hardware of a control server.

FIG. 3 is a diagram illustrating an example of hardware of the control server. The control server 100 includes a processor 101, a RAM 102, an HDD 103, a network interface card (NIC) 104, an image signal processing unit 105, an input signal processing unit 106, a disk drive 107, and a device connecting unit 108. The units 101 to 108 are connected to a bus of the server 100. The server 200 and the client 400 may be achieved using the same units as the control server 100.

The processor 101 controls information processing of the control server 100. The processor 101 may be a multiprocessor. The processor 101 is, for example, a CPU, a DSP, an ASIC, an FPGA, or the like. The processor 101 may be a combination of at least two of the CPU, the DSP, the ASIC, the FPGA, or the like.

The RAM 102 is a main storage device of the control server 100. The RAM 102 temporarily stores at least a part of applications and an OS that are executed by the processor 101. The RAM 102 stores data of various types that is to be used for processes to be executed by the processor 101.

The HDD 103 is an auxiliary storage device of the control server 100. The HDD 103 magnetically writes and reads data in and from a magnetic disk included in the HDD 103. The OS, the application programs, and the data of the various types are stored in the HDD 103. The control server 100 may include auxiliary storage devices of other types such as a flash memory and a solid state drive (SSD). The control server 100 may include multiple auxiliary storage devices.

The NIC 104 is a communication interface configured to communicate with other devices (for example, the server 200 and the switch 300) through the network 10.

The image signal processing unit 105 outputs, in accordance with a command from the processor 101, an image to a display 11 connected to the control server 100. As the display 11, a cathode ray tube (CRT) display, a liquid crystal display, or the like may be used.

The input signal processing unit 106 acquires an input signal from an input device 12 connected to the control server 100 and outputs the input signal to the display 11. As the input device 12, a pointing device such as a mouse or a touch panel, a keyboard, or the like may be used.

The display drive 107 is a driving device configured to use laser light or the like to read a program stored in an optical disc 13 and data stored in the optical disc 13. As the optical disc 13, a digital versatile disc (DVD), a DVD-RAM, a compact disc read only memory (CD-ROM), a CD-Recordable (CD-R), a CD-ReWritable (CD-RW), or the like may be used. The disk drive 107 causes the program read from the optical disc 103 and the data read from the optical disc 13 to be stored in the RAM 102 or the HDD 103 in accordance with a command from the processor 101, for example.

The device connecting unit 108 is a communication interface configured to connect a peripheral device to the control server 100. For example, the device connecting unit 108 may be connected to a memory device 14 and a reader-writer device 15. The memory device 14 is a recording medium with a function of communicating with the device connecting unit 108. The reader-writer device 15 is a device configured to write data in a memory card 16 and read data from the memory card 16. The memory card 16 is a card-type recording medium. The device connecting unit 108 causes a program read from the memory device 14 or the memory card 16 and data read from the memory device 14 or the memory card 16 to be stored in the RAM 102 and the HDD 103 in accordance with a command from the processor 101, for example.

Figure 4:
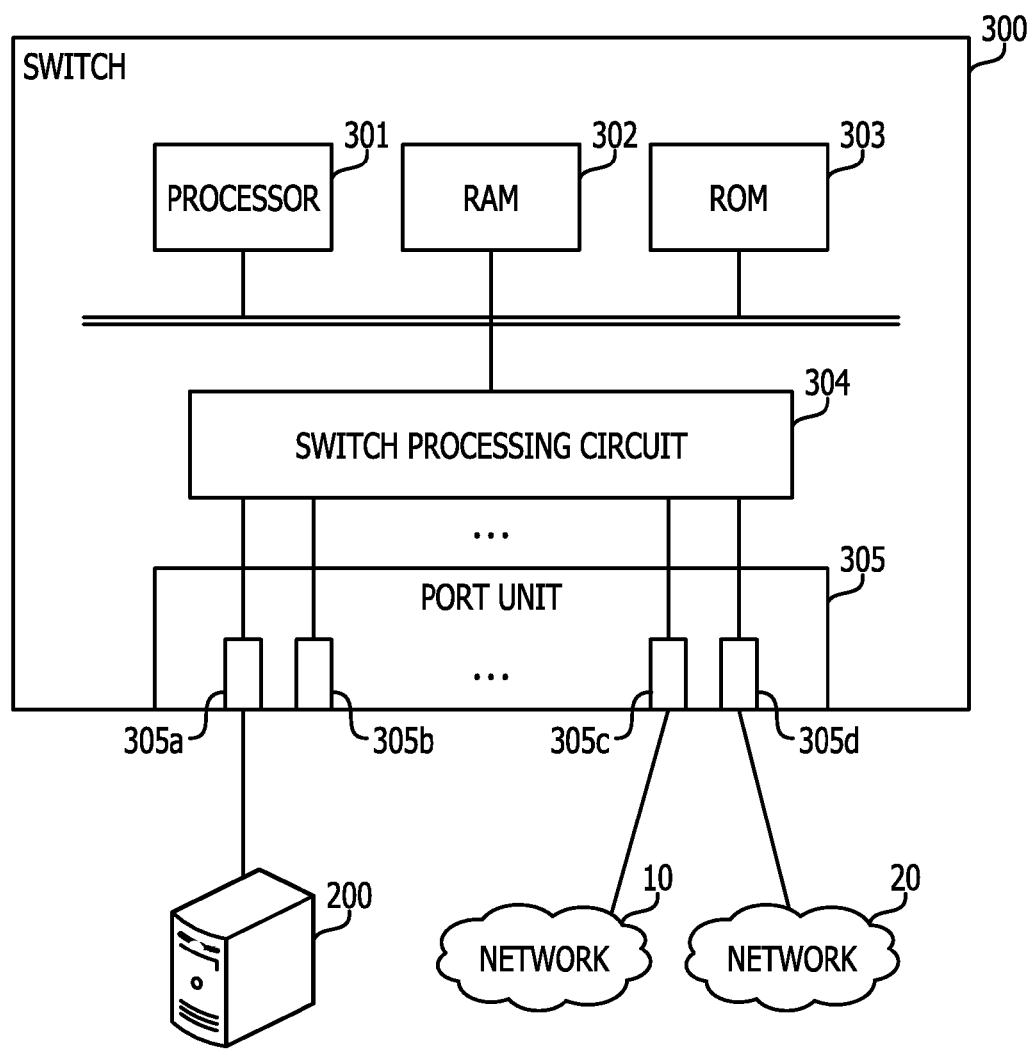
FIG. 4 is a diagram illustrating an example of hardware of a switch.

FIG. 4 is a diagram illustrating an example of hardware of the switch. The switch 300 includes a processor 301, a RAM 302, a ROM 303, a switch processing circuit 304, and a port unit 305.

The processor 301 controls information processing of the switch 300. The processor 301 may be a multiprocessor. The processor 301 is, for example, a CPU, a DSP, an ASIC, an FPGA, or the like. The processor 301 may be a combination of at least two of the CPU, the DSP, the ASIC, the FPGA, or the like.

The RAM 302 temporarily stores a firmware program and data. The program and the data that are stored in the RAM 302 are used for processes of the processor 301.

The ROM 303 has, stored therein, the firmware program and the data. The ROM 303 may be a rewritable nonvolatile memory such as a flash memory. The program and the data that are stored in the ROM 303 are used for the processes of the processor 301.

The switch processing circuit 304 outputs a packet received by any port included in the port unit 305 to another port. The switch processing circuit 304 executes a QoS process, a filtering process, and a mirroring process. The QoS process includes marking, policing, and scheduling, for example. The filtering process is filtering to be executed based on a combination of transmitting and receiving ports or a combination of media address control (MAC) addresses of the transmitting and receiving ports, for example. The mirroring process is a process of copying a frame input to a certain port and outputting the frame from another port (for example, a port for monitoring) and a port connected to a destination.

The switch processing circuit 304 includes a dedicated processor configured to execute these switch processes. The switch processes may be executed by hardware. The switch processing circuit 304 may execute the switch processes of the virtual switch executed on the server 200 during the offloading.

The port unit 305 is a network interface with a plurality of ports. The plurality of ports include ports 305a, 305b, 305c, and 305d. The port 305a is connected to the server 200. The port 305c is connected to the network 10. The port 305d is connected to the network 20.

Figure 5:
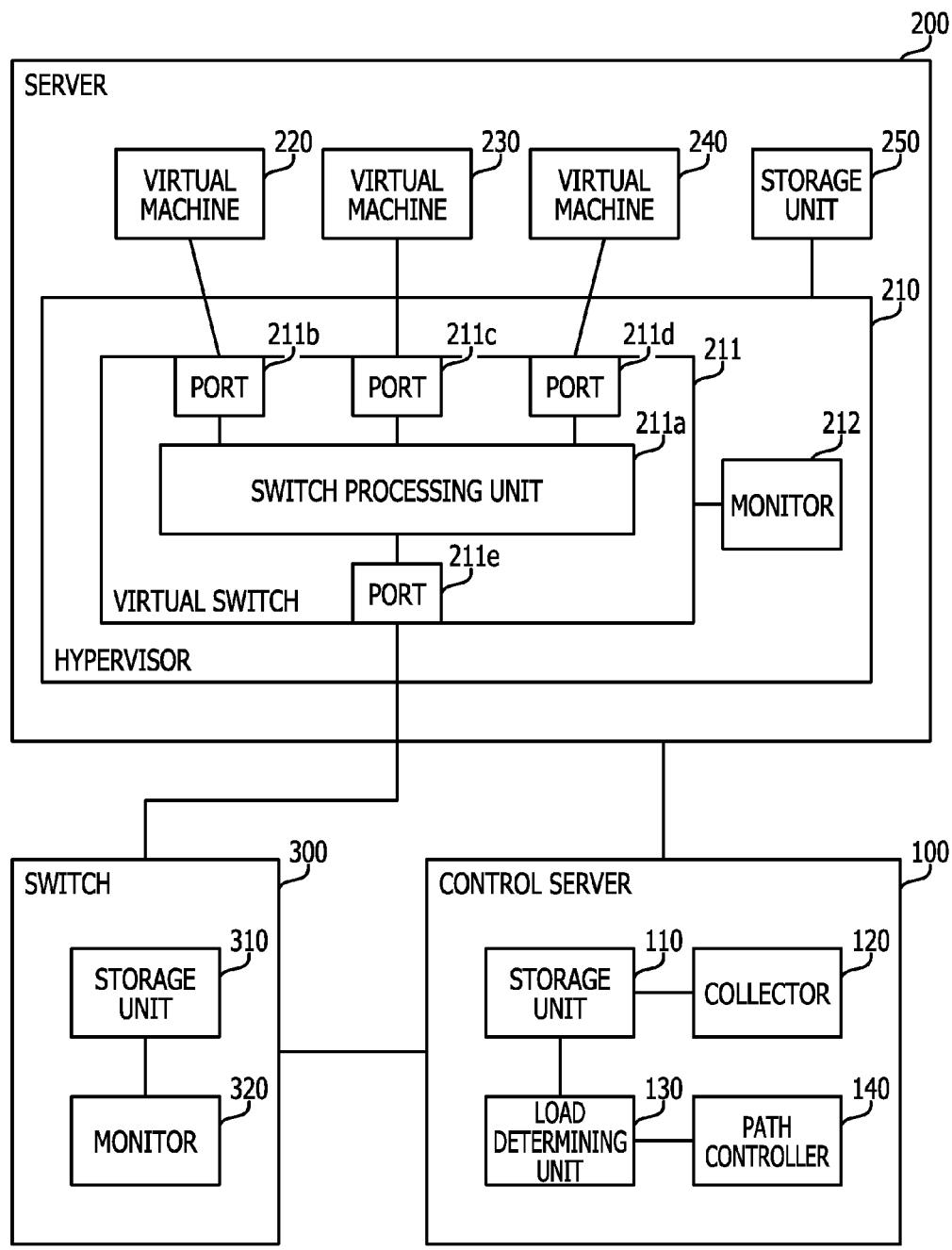
FIG. 5 is a diagram illustrating an example of software of devices.

FIG. 5 is a diagram illustrating an example of software of the devices. Units illustrated in FIG. 5 are achieved by causing the processors of the devices to execute programs stored in the RAMs of the devices. The control server 100 includes a storage unit 110, a collector 120, a load determining unit 130, and a path controller 140.

The storage unit 110 stores information to be used for processes of the collector 120, the load determining unit 130, and the path controller 140. Specifically, the storage unit 110 stores settings information to be used to collect information from the server 200 and the switch 300 and to determine loads. In addition, the storage unit 110 stores information acquired by the collector 120 from the server 200 and the switch 300. The storage unit 110 may be achieved by using a storage region of the RAM 102, a storage region of the HDD 103, and the like.

The collector 120 acquires information from the server 200 and the switch 300 based on the settings information stored in the storage unit 110 and causes the acquired information to be stored in the storage unit 110. Specifically, the collector 120 acquires information of a load, caused by a process of the hypervisor, of the server 200. In addition, the collector 120 acquires information of amounts of communication executed by the server 200.

The information of the communication amounts includes the amount (1) of communication between virtual machines executed on the server 200 and the amount (2) of communication between the virtual machines executed on the server 200 and another external device arranged outside the server 200. Since the virtual machines are executed on the server 200, the communication amount (2) may be interpreted as the amount of the communication between the server 200 and the other device.

The collector 120 may separately acquire the communication amounts (1) and (2) from the server 200 (in a first method). Alternatively, the collector 120 may acquire the communication amount (1) and the total of the communication amounts (1) and (2) from the server 200 (in a second method). This is due to the fact that the total of the communication amounts (1) and (2) is used to estimate a load of the virtual switch, as described later.

If the collector 120 separately acquires the communication amounts (1) and (2) in the first method, the collector 120 calculates the total of the communication amounts (1) and (2) and records the calculated total value. If the collector 120 acquires the communication amount (1) and the total of the communication amounts (1) and (2) from the server 200, the collector 120 records the acquired total value. The second embodiment assumes that the communication amounts are acquired in the second method. Processes to be executed in the first method are the same as the second method, except for the acquisition of the total of the communication amounts by the collector 120. Since the communication amount (2) is obtained by subtracting the communication amount (1) from the total of the communication amounts (1) and (2), a pair of the communication amount (1) and the total of the communication amounts (1) and (2) may be interpreted as information representing the communication amount (2). The collector 120 may use SNMP to collect the information.

The load determining unit 130 evaluates, based on the information acquired by the collector 120 from the server 200 and the switch 300, a load of the virtual switch executed on the server 200. The load determining unit 130 determines, based on the evaluated load of the virtual switch, whether or not the offloading is to be executed. If the load determining unit 130 determines that the offloading is to be executed, the load determining unit 130 notifies the path controller 140 of the execution of the offloading.

In this case, if the server 200 and the switch 300 are in the offloading state, the collector 120 continuously acquires the load of the server 200 and the load of the switch 300. The load determining unit 130 determines, based on the loads, whether or not the offloading state is to be released. If the load determining unit 130 determines that the offloading state is to be released, the collector 120 notifies the path controller 140 of the release of the offloading state.

When receiving, from the load determining unit 130, the notification representing the execution of the offloading, the path controller 140 instructs the server 200 and the switch 300 to execute the offloading. When receiving, from the load determining unit 130, the notification representing the release of the offloading state, the path controller 140 instructs the server 200 and the switch 300 to release the offloading state.

The server 200 includes a hypervisor 210, virtual machines 220, 230, and 240, and a storage unit 250. The hypervisor 210 assigns resources of the server 200 to the virtual machines 220, 230, and 240. The hypervisor 210 includes a virtual switch 211 and a monitor 212.

The virtual switch 211 relays communication between the virtual machines 220, 230, and 240 and communication between another device (for example, the client 400) and the virtual machines 220, 230, and 240. The virtual switch 211 includes a switch processing unit 211a and ports 211b, 211c, 211d, and 211e.

The switch processing unit 211a outputs a packet received by any port included in the virtual switch 211 to another port. The switch processing unit 211a executes the QoS process. For example, the switch processing unit 211a may execute the QoS process for each of the ports. The switch processing unit 211a executes the filtering process and the mirroring process in the same manner as the switch processing circuit 304. In this manner, the virtual switch 211 executes the switch processes using software. Upon the offloading, the switch processing unit 211a and the switch 300 interoperate with each other so as to execute the switch processes.

The ports 211b, 211c, 211d, and 211e are virtual ports included in the virtual switch 211. For example, the virtual machine 220 may communicate with the other virtual machines and the other devices through the port 211b. The virtual machine 230 may communicate with the other virtual machines and the other devices through the port 211c. The virtual machine 240 may communicate with the other virtual machines and the other devices through the port 211d. The port 211e is used when at least one of the virtual machines 220, 230, and 240 communicates with an external device arranged outside the server 200.

The monitor 212 periodically acquires a load (for example, CPU utilization caused by a process of the hypervisor 210), caused by the hypervisor 210, of a processor included in the server 200. The monitor 212 periodically acquires the amount of communication (hereinafter referred to as communication between the virtual machines in some cases) executed through the virtual switch 211 between the virtual machines 220, 230, and 240. In addition, the monitor 212 periodically acquires the amount of communication executed through the virtual switch 211 between the external device (for example, the client 400) and the virtual machines 220, 230, and 240.

The monitor 212 references destinations of communication data received from the virtual ports 211b, 211c, 211d, and 211e and determines a port that is among the ports of the virtual switch 211 and from which the communication data is to be output. If the communication data is received from a port connected to any of the virtual machines and to be output from a port connected to another one of the virtual machines, communication is executed between the virtual machines. If a port that has received the communication data or a port that will output the communication data is the port 211e, the communication is executed between the external device and the server 200.

The monitor 212 provides the acquired information to the control server 100 in accordance with a request from the control server 100. Specifically, the monitor 212 provides, to the control server 100, information of the load, caused by the hypervisor 210, of the server 200. The monitor 212 provides, to the control server 100, the amount of the communication executed through the virtual switch 211 between the virtual machines 220, 230, and 240. The monitor 212 provides, to the control server 100, the total (total communication amount) of the amount (first communication amount) of the communication between the virtual machines and the amount (second communication amount) of the communication executed through the virtual switch 211 between the external device and the virtual machines 220, 230, and 240. The monitor 212 may separately provide the first and second communication amounts to the control server 100, and the control server 100 may calculate the total communication amount by calculating the total of the first and second communication amounts, depending on a process of the control server 100.

The monitor 212 may use SNMP to provide the aforementioned information to the control server 100. For example, the collector 120 transmits, to the server 200, an SNMP request that specifies predetermined MIB information representing the load and the communication amounts. Then, the collector 120 may acquire, from the server 200, the MIB information as a response to the SNMP request.

The virtual machines 220, 230, and 240 are virtual computers to be executed on the server 200. The virtual machines 220, 230, and 240 separately execute OSs and provide various services to the client 400. The storage unit 250 stores information to be used for processes of the hypervisor 210. Specifically, the storage unit 250 stores the information acquired by the monitor 212. The storage unit 250 may be achieved by the storage region of the RAM included in the server 200, the storage region of the HDD included in the server 200, and the like.

The switch 300 includes a storage unit 310 and a monitor 320. The storage unit 310 stores information acquired by the monitor 320. The storage unit 310 may be achieved by a storage region of the RAM included in the switch 300 or the like.

The monitor 320 periodically acquires the load of the switch 300. Specifically, the monitor 320 acquires the utilization of the processor included in the switch processing circuit 304 and provided for the switch processes. The monitor 320 provides the acquired information to the control server 100 in accordance with a request from the control server 100.

The collector 120 transmits, to the switch 300, an SNMP request that specifies predetermined MIB information (specific to the type of the switch 300) representing the load of the switch 300. Then, the collector 120 may acquire the MIB information from the switch 300 as a response to the request.

FIG. 6 is a diagram illustrating an example of a virtual switch monitoring and setting table. A virtual switch monitoring and setting table 111 is settings information to be used to monitor the server 200 and the virtual switch 211. The virtual switch monitoring and setting table 111 is stored in the storage unit 110. The virtual switch monitoring and setting table 111 includes fields for parameter names, values, and details. In the field for parameter names, the names of parameters are registered. In the field for values, setting values of the parameters are registered. In the field for details, details of the parameters and units of the values are registered.

For example, the following parameters and setting values of the parameters are registered in the virtual switch monitoring and setting table 111. In a first row of the table 111, a parameter with a name of "perf_interval_hv_cpu", a value of "30", and a detail representing an "MIB acquisition interval (seconds)" is registered. The first row indicates that time intervals at which MIB information is acquired through SNMP are 30 seconds.

In a second row of the table 111, a parameter with a name of "perf_time_hv_cpu", a value of "300", and a detail representing a "load calculation interval (seconds)" is registered. The second row indicates that time intervals at when a CPU load caused by the hypervisor 210 and the load of the virtual switch 211 are calculated are 300 seconds.

In a third row of the table 111, a parameter with a name of "perf_offload_avg_cpu", a value of "95", and a detail representing an "HV's (hypervisor's) CPU utilization threshold (%)" is registered. The third row indicates that a lower limit, causing the load determining unit 130 to determine that the offloading is to be executed, of CPU utilization of the hypervisor 210 is 95%. The collector 120 may acquire, as the CPU utilization, CPU utilization of the hypervisor 210 in a Kernel mode.

In a fourth row of the table 111, a parameter with a name of "perf_offload_avg_io", a value of "30", and a detail representing a "virtual switch load threshold (%)" is registered. The fourth row indicates that a lower limit, causing the load determining unit 130 to determine that the offloading is to be executed, of a ratio of the amount of communication between the virtual machines to a total amount of communication of the virtual switch 211 is 30%. According to the aforementioned set values, if the CPU utilization of the hypervisor 210 is equal to or higher than 95% and the ratio of the amount of the communication between the virtual machines to the total amount of the communication of the virtual switch 211 is equal to or higher than 30%, the load determining unit 130 determines that the offloading is to be executed.

Figure 7:
FIG. 7 is a diagram illustrating an example of a physical switch monitoring and setting table.

FIG. 7 is a diagram illustrating an example of a physical switch monitoring and setting table. A physical switch monitoring and setting table 112 is settings information to be used to monitor the switch 300. The physical switch monitoring and setting table 112 is stored in the storage unit 110. The physical switch monitoring and setting table 112 includes fields for parameter names, values, and details. In the field for parameter names, the names of parameters are registered. In the field for values, setting values of the parameters are registered. In the field for details, details of the parameters and units of the setting values are registered.

For example, in the physical switch monitoring and setting table 112, the following parameters and setting values of the parameters are registered. In a first row of the table 112, a parameter with a name of "perf_interval_psw_cpu", a value of "30", and a detail representing an "MIB information interval (seconds)" is registered. The first row indicates that time intervals at which MIB information is acquired through SNMP are 30 seconds.

In a second row of the table 112, a parameter with a name of "perf_time_psw_cpu", a value of "300", and a detail representing a "load calculation interval (seconds)" is registered. The second row indicates that time intervals at which the load of the switch 300 is calculated are 300 seconds.

In a third row of the table 112, a parameter with a name of "perf_offload_avg_psw_load", a value of "30", and a detail representing a "physical switch load threshold (%)" is registered. The third row indicates that an upper limit, causing the load determining unit 130 to determine that the offloading is to be executed, of the load of the physical switch 300 is 30%. According to the setting values, if the load of the switch 300 is 30% or less, the load determining unit 130 determines that the offloading is to be executed.

The information set in the virtual switch monitoring and setting table 111 and the physical switch monitoring and setting table 112 is an example. For example, the control server 100 permits a user to register setting values in the virtual switch monitoring and setting table 111 and the physical switch monitoring and setting table 112 based on an operation.

FIG. 8 is a diagram illustrating an example of a server measurement table. A server measurement table 113 is a table for storing acquired information on the server 200. The server measurement table 113 is stored in the storage unit 110. The server measurement table 113 includes fields for measurement numbers, HV's (hypervisor's) CPU utilization (%), the amounts (bytes) of communication between the virtual machines, and total amounts (bytes) of communication (hereinafter, units are omitted when the field names are described).

In the field for measurement numbers, the number of times of measurement is registered in each row. For example, according to the information set in the virtual switch monitoring and setting table 111, the time intervals at which MIB information is acquired are 30 seconds, and the time intervals at which the load is calculated are 300 seconds. Thus, MIB information is acquired 10 times until the first calculation of the load is executed. In the field for HV's CPU utilization, the CPU utilization of the HV is registered in each row. In the field for the amounts of communication between the virtual machines, the amount of communication between the virtual machines through the virtual switch 211 is registered in each row. In the field for the total amounts of communication, a total amount of communication executed through the virtual switch 211 is registered in each row. The communication amount registered in the field for the amount of communication between the virtual machines and the communication amount registered in the field for the total amount of communication are amounts accumulated after MIB information is previously acquired. For example, if the time intervals at which MIB information is acquired are 30 seconds, the communication amounts are amounts accumulated for a time period of 30 seconds.

For example, in the server measurement table 113, information, which represents a measurement number indicating the "first" measurement, HV's CPU utilization of "96", and a total communication amount of "5678" and represents that the amount of communication between the virtual machines is "1234", is registered. Specifically, the information represents that the CPU utilization of the hypervisor 210 upon the first acquisition (first acquisition immediately after the load is previously calculated) of MIB information on the server 200 is 96%. In addition, the information represents that the amount (accumulated for the past time period of 30 seconds) of the communication executed through the virtual switch 211 between the virtual machines is 1234 bytes. Furthermore, the information represents that the total amount (accumulated for the past time period of 30 seconds) of the communication executed through the virtual switch 211 is 5678 bytes. The same applies to other information.

FIG. 9 is a diagram illustrating an example of a physical switch measurement table. A physical switch measurement table 114 is a table for storing acquired information on the switch 300. The physical switch measurement table 114 is stored in the storage unit 110. The physical switch measurement table 114 includes fields for measurement numbers and physical switch loads (%) (hereinafter, units are omitted when the field names are described).

In the field for measurement numbers, the number of times of measurement is registered in each row. For example, according to the information set in the physical switch monitoring and setting table 112, the time intervals at which MIB information is acquired are 30 seconds, and the time intervals at which the load is calculated is 300 seconds. Thus, MIB information is acquired 10 times until the first calculation of the load is executed. In the field for physical switch loads, an acquired load of the switch 300 is registered in each row.

For example, in the physical switch measurement table 114, information that represents the "first" measurement and represents that the load of the physical switch load is "20" is registered. Specifically, the information represents that the load of the switch 300 is 20% upon the first acquisition (first acquisition immediately after the load is previously calculated) of MIB information on the switch 300.

As the load of the switch 300, a value specific to the type of the switch may be acquired as described above. For example, the collector 120 may acquire, as the load of the switch 300, average utilization (average busy rate) of the processor provided for the switch processes and included in the switch processing circuit 304 for a predetermined time (of 5 minutes, 1 minute, 5 seconds, or the like).

Figure 10:
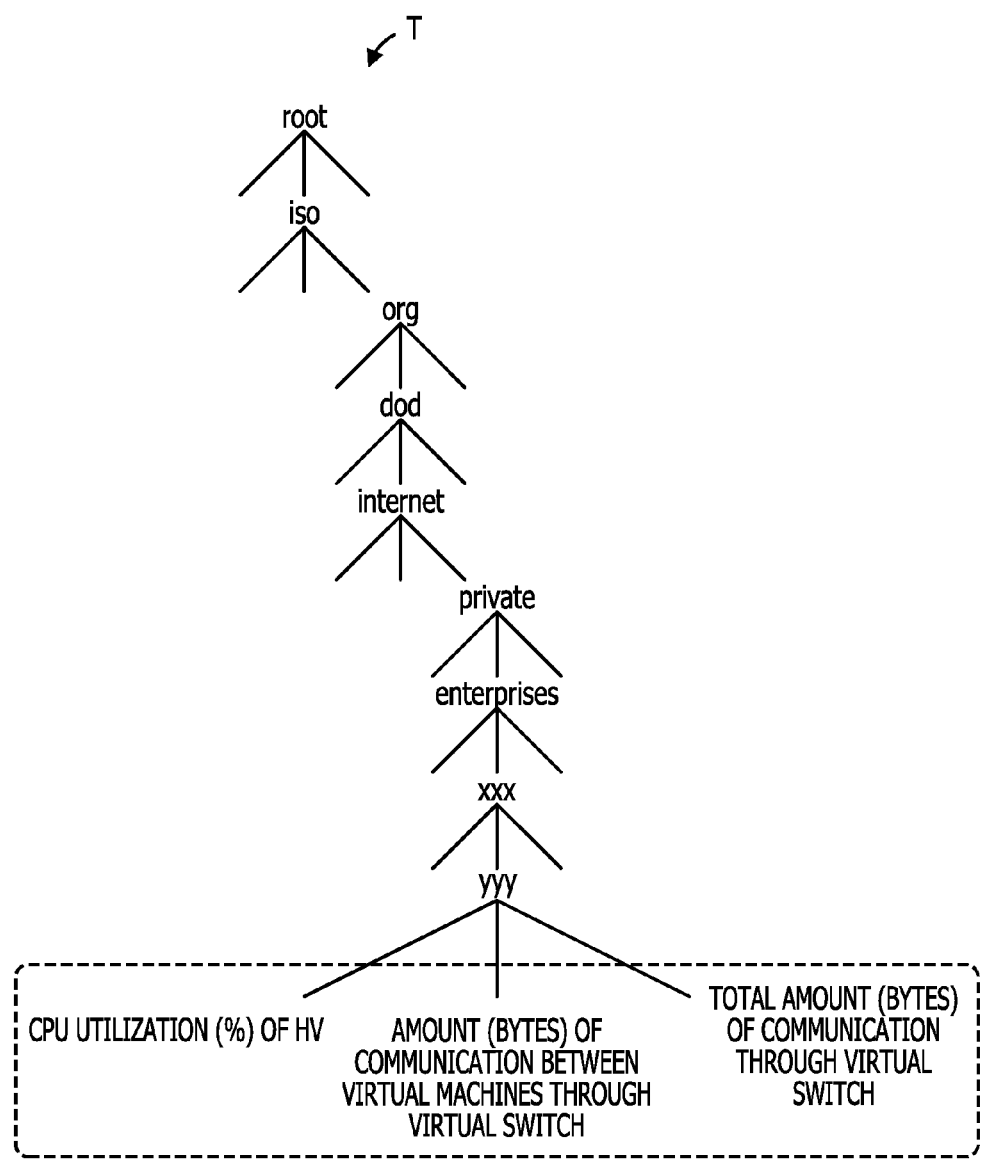
FIG. 10 is a diagram illustrating an example of MIB information.

FIG. 10 is a diagram illustrating an example of MIB information. An MIB tree T represents a tree structure of MIB information as an example. For example, as a private MIB, MIB objects are prepared and correspond to the CPU utilization of the hypervisor 210, the amount of communication executed through the virtual switch 211 between the virtual machines, the total amount of communication executed through the virtual switch 211. The collector 120 transmits, to the server 200, an SNMP request that specifies identifiers (for example, object identifiers (OID)) of the MIB objects. Then, the monitor 212 acquires, from the storage unit 250, information corresponding to the specified identifiers and provides the acquired information to the control server 100.

Figure 11:
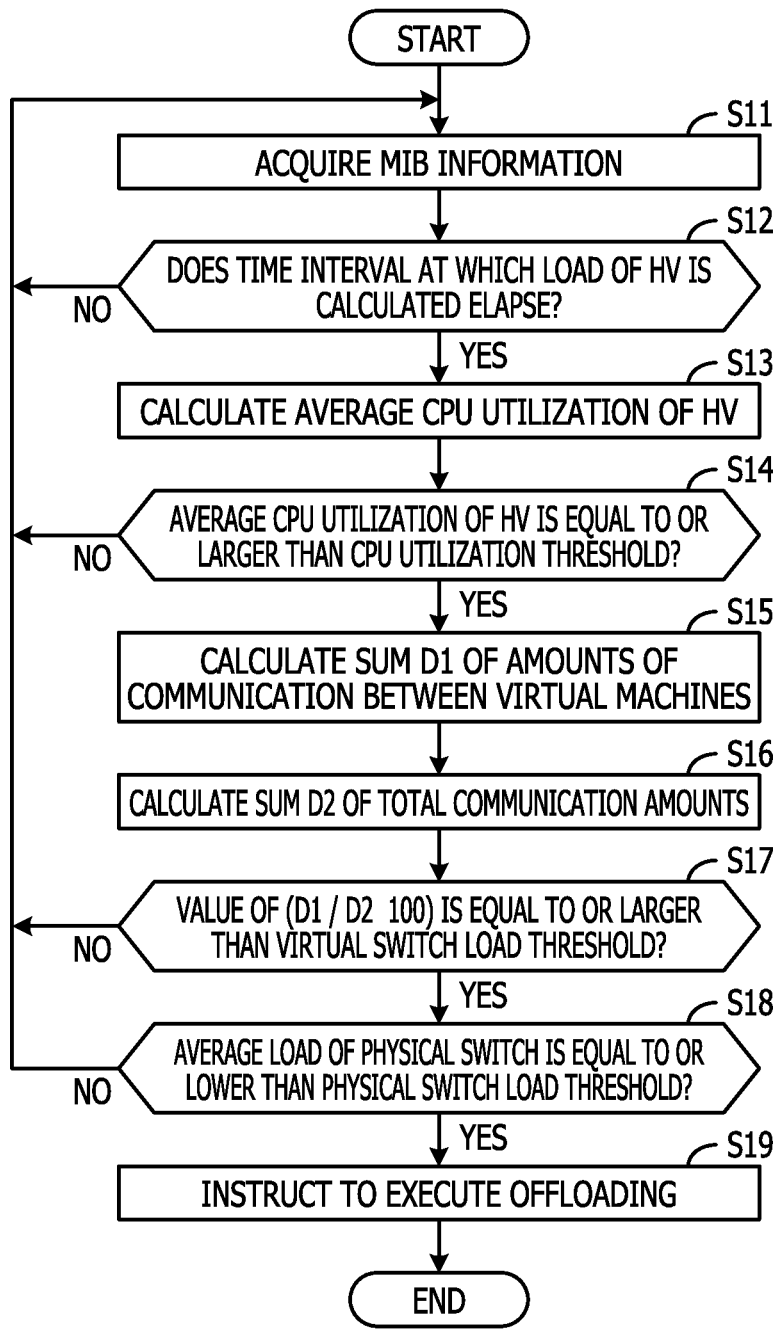
FIG. 11 is a flowchart of an example of a process of determining whether or not offloading is to be executed.

FIG. 11 is a flowchart of an example of a process of determining whether or not the offloading is to be executed. Hereinafter, the process illustrated in FIG. 11 is described using step numbers. The following process is executed when the server 200 and the switch 300 are not in the offloading state.

In S11, the collector 120 acquires MIB information from the server 200. The MIB information acquired by the collector 120 includes the CPU utilization of the hypervisor 210, the amount of communication executed through the virtual switch 211 between the virtual machines, and the total amount of communication executed through the virtual switch 211. The collector 120 acquires the MIB information at MIB acquisition intervals (of, for example, 30 seconds) registered in the virtual switch monitoring and setting table 111. The collector 120 registers the acquired MIB information in the server measurement table 113 (the measurement number represents the first measurement if the measurement is executed immediately after the calculation of the load in step S13 described later, and after that, the measurement number is incremented by 1 and registered).

In S12, the load determining unit 130 references the virtual switch monitoring and setting table 111 and determines whether or not a time that corresponds to the load calculation interval elapses after previous calculation of the load of the hypervisor 210 (or after the start of the acquisition of the MIB information from the server 200 if the calculation of the load of the hypervisor 210 is the first calculation). If the time that corresponds to the load calculation interval elapses, the process proceeds to step S13. If the time that corresponds to the load calculation interval does not elapse, the process returns to step S11. For example, according to the virtual switch monitoring and setting table 111, the load calculation interval is 300 seconds.

In S13, the load determining unit 130 references the server measurement table 113 and calculates average CPU utilization (avg_cpu) of the hypervisor 210. For example, since 10 measured values are registered in the server measurement table 113, a value obtained by dividing the total of the measurement values by 10 is the average CPU utilization of the hypervisor 210 (the division is referred to as the load calculation).

In S14, the load determining unit 130 determines whether or not the average CPU utilization calculated in step S13 is equal to or larger than the CPU utilization threshold (of, for example, 95%) registered in the virtual switch monitoring and setting table 111. If the average CPU utilization is equal to or larger than the CPU utilization threshold, the process proceeds to step S15. If the average CPU utilization is smaller than the CPU utilization threshold, the process returns to step S11. When the process returns to step S11, the load determining unit 130 clears details registered in the server measurement table 113.

In S15, the load determining unit 130 references the server measurement table 113 and calculates a sum D1 (sum_pkt_vm) of amounts of communication executed through the virtual switch 211 between the virtual machines. For example, since 10 measured amounts of communication between the virtual machines are registered in the server measurement table 113, the sum of the 10 measured amounts is the sum D1.

In S16, the load determining unit 130 references the server measurement table 113 and calculates a sum D2 (sum_pkt_all) of total amounts of communication executed through the virtual switch 211. For example, since 10 measured total communication amounts are registered in the server measurement table 113, the sum of the 10 measured total communication amounts is the sum D2.

In S17, the load determining unit 130 determines whether or not the ratio (D1/D2×100(%)) of the amount of the communication between the virtual machines to the total communication amount is equal to or larger than a virtual switch load threshold (of, for example, 30%) registered in the virtual switch monitoring and setting table 111. If the ratio is equal to or larger than the virtual switch load threshold, the process proceeds to step S18. If the ratio is smaller than the virtual switch load threshold, the process returns to step S11. When the process returns to step S11, the load determining unit 130 clears the details registered in the server measurement table 113.

In S18, the load determining unit 130 determines whether or not an average load of the switch 300 is equal to or smaller than the physical switch load threshold (of, for example, 30%) registered in the physical switch monitoring and setting table 112. If the average load of the switch 300 is equal to or smaller than the physical switch load threshold, the process proceeds to step S19. If the average load of the switch 300 is larger than the physical switch load threshold, the process returns to step S11. When the process returns to step S11 or proceeds to step S19, the load determining unit 130 clears the details registered in the server measurement table 113. In addition, as described later with reference to FIG. 12, the load determining unit 130 continuously acquires the average load of the switch 300 and causes the acquired average load to be stored in the storage unit 110.

In S19, the load determining unit 130 notifies the path controller 140 of the execution of the offloading. The path controller 140 instructs the server 200 and the switch 300 to execute the offloading. When receiving the instruction, the server 200 and the switch 300 execute the offloading.

In this manner, the control server 100 determines, based on the load and communication amount of the server 200, whether or not the offloading is to be executed. The offloading may be executed regardless of the load of the switch 300. In this case, if the load determining unit 130 determines whether or not the ratio of (D1/D2×100(%)) is equal to or larger than the virtual switch load threshold in step S17, step S18 may be skipped and step S19 may be executed. Next, the acquisition of the load of the switch 300 by the control server 100 is described.

Figure 12:
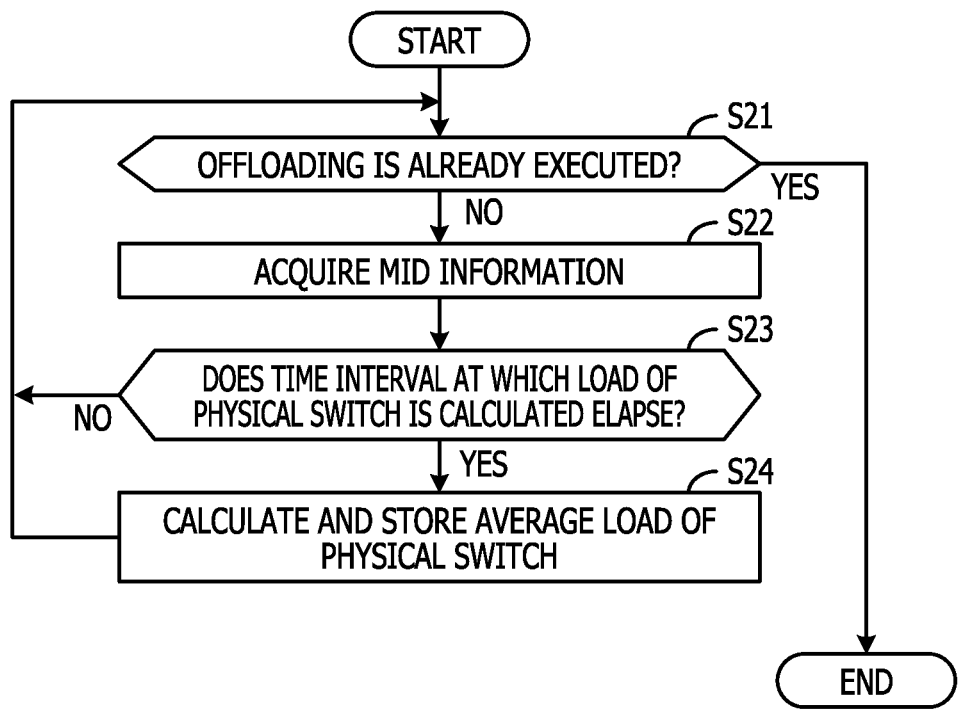
FIG. 12 is a flowchart of an example of a process of acquiring a load of the physical switch.

FIG. 12 is a flowchart of an example of a process of acquiring the load of the physical switch. Hereinafter, the process illustrated in FIG. 12 is described using step numbers.

In S21, the collector 120 determines whether or not the server 200 and the switch 300 are in the offloading state in which the offloading is executed. If the server 200 and the switch 300 are in the offloading state, the process is terminated. If the server 200 and the switch 300 are not in the offloading state, the process proceeds to step S22. For example, if a previous instruction transmitted by the path controller 140 to the server 200 and the switch 300 is an instruction to execute the offloading, the server 200 and the switch 300 are in the offloading state. If the previous instruction is an instruction to release the offloading state, the server 200 and the switch 300 are not in the offloading state.

In S22, the collector 120 acquires MIB information from the switch 300. The MIB information acquired by the collector 120 includes information of the load of the switch 300. The collector 120 acquires the MIB information at MIB acquisition intervals (of, for example, 30 seconds) registered in the physical switch monitoring and setting table 112. The collector 120 registers the acquired information in the physical switch measurement table 114 (the measurement number represents the first measurement if the measurement is executed immediately after the calculation of the load in step S24 described later, and after that, the measurement number is incremented by 1 and registered).

In S23, the collector 120 references the physical switch monitoring and setting table 112 and determines whether or not a time that corresponds to the load calculation interval elapses after previous calculation of the load of the switch 300 (or after the start of the acquisition of the MIB information from the switch 300 if the calculation of the load of the switch 300 is the first calculation). If the time that corresponds to the load calculation interval elapses, the process proceeds to step S24. If the time that corresponds to the load calculation interval does not elapse, the process returns to step S21. For example, according to the physical switch monitoring and setting table 112, the load calculation interval is 300 seconds.

In S24, the load determining unit 130 references the physical switch measurement table 114 and calculates an average load of the switch 300. For example, since 10 measured values are registered in the physical switch measurement table 114, a value obtained by dividing the total of the measured values by 10 is the average load of the switch 300 (the division is referred to as load calculation). The load determining unit 130 causes the calculated average load to be stored in the storage unit 110 (it is sufficient if the latest value is maintained). The load determining unit 130 clears details registered in the physical switch measurement table 114. Then, the process returns to step S21.

In this manner, the control server 100 continuously monitors the load of the switch 300. As described above, however, if step S18 illustrated in FIG. 11 is skipped, the control server 100 may not execute the process illustrated in FIG. 12 or monitor the load of the switch 300.

The average load may be calculated using any of various methods in step S24 based on the type of the physical switch. This is due to the fact that the MIB information to be acquired varies depending on the type of the physical switch. As described above, if the utilization (for example, average utilization for a past predetermined time) of the processor for the switch processes is acquired, the average load of the physical switch is calculated by dividing acquired values of utilization of the processor for the switch processes by the number of times of the measurement. In addition, if the number of all cycles of the processor for a predetermined time and the number of idle cycles of the processor for the predetermined time are acquired, an average load of the physical switch for the predetermined time may be calculated by calculating a value of ((the number of all the cycles−the number of the idle cycles)/the number of all the cycles).

Immediately after the instruction to execute the offloading is provided (immediately after step S19 illustrated in FIG. 11), the control server 100 may reset the details registered in the server measurement table 113, the details registered in the physical switch measurement table 114, and timer values to be used for the monitoring.

After the execution of the offloading, the control server 100 continuously collects the MIB information from the server 200 and the switch 300 and determines whether or not the offloading state is to be released. Next, a procedure for this process is described.

Figure 13:
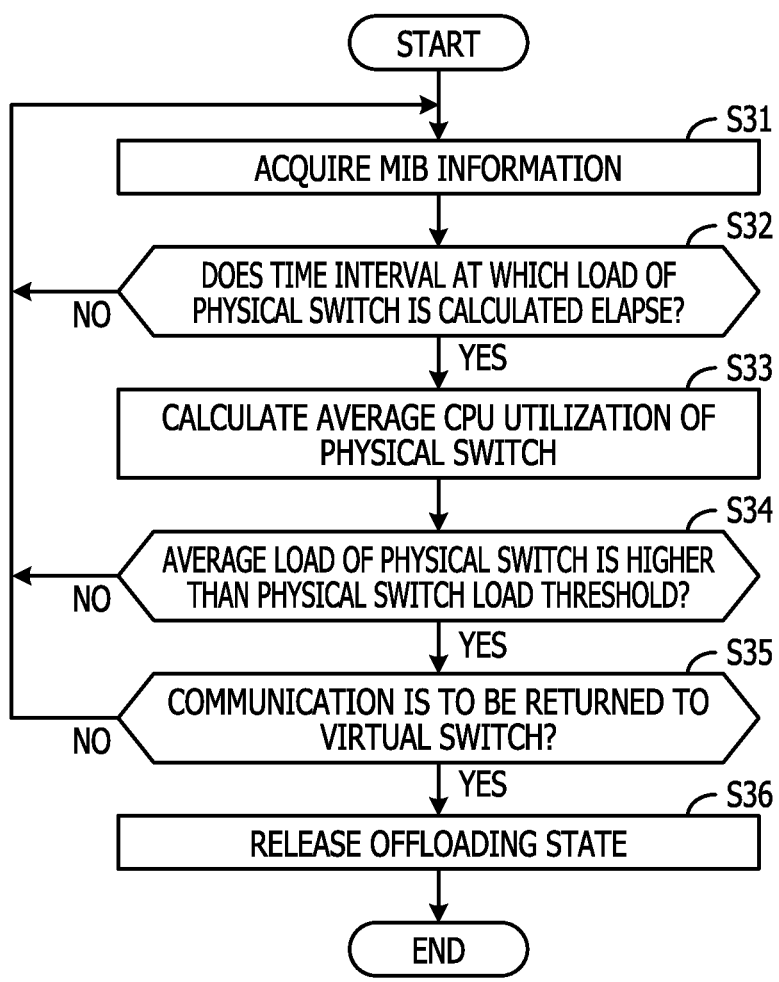
FIG. 13 is a flowchart of an example of a process of determining release of an offloading state.

FIG. 13 is a flowchart of an example of the process of determining the release of the offloading state. Hereinafter, the process illustrated in FIG. 13 is described using step numbers. The following process is executed when the server 200 and the switch 300 are in the offloading state.

In S31, the collector 120 acquires MIB information from the switch 300. The MIB information acquired by the collector 120 includes information of the load of the switch 300. The collector 120 acquires the MIB information at the MIB acquisition intervals (of, for example, 30 seconds) registered in the physical switch monitoring and setting table 112. The collector 120 registers the acquired information in the physical switch measurement table 114 (the measurement number represents the first measurement if the measurement is executed immediately after the calculation of the load in step S33 described later, and after that, the measurement number is incremented by 1 and registered).

In S32, the collector 120 references the physical switch monitoring and setting table 112 and determines whether or not a time that corresponds to the load calculation interval elapses after previous calculation of the load of the switch 300 (or after the start of the acquisition of the MIB information from the switch 300 if the calculation of the load of the switch 300 is the first calculation). If the time that corresponds to the load calculation interval elapses, the process proceeds to step S33. If the time that corresponds to the load calculation interval does not elapse, the process returns to step S31. For example, according to the physical switch monitoring and setting table 112, the load calculation interval is 300 seconds.

In S33, the load determining unit 130 references the physical switch measurement table 114 and calculates an average load of the switch 300. For example, since the 10 measured values are registered in the physical measurement table 114, the value obtained by dividing the total of the measured values by 10 is the average load of the switch 300.

In S34, the load determining unit 130 determines whether or not the average load, calculated in step S33, of the switch 300 is larger than the physical switch load threshold (of, for example, 30%) registered in the physical switch monitoring and setting table 112. If the average load of the switch 300 is larger than the physical switch load threshold, the process proceeds to step S35. If the average load of the switch 300 is equal to or smaller than the physical switch load threshold, the process returns to step S31. When the process returns to step S31, the load determining unit 130 clears the details registered in the physical switch measurement table 114.

In S35, the load determining unit 130 confirms the load of the server 200 and determines whether or not the communication between the virtual machines is to be returned to the virtual switch 211 (or whether or not the offloading state is to be released). The fact that the communication is to be returned indicates that the load determining unit 130 confirms that the server 200 is not overloaded. A state in which the communication is to be returned is a state in which the following requirements (1) and (2) are satisfied. If at least one of the requirements (1) and (2) is not satisfied, the communication is not to be returned.

(1) Average CPU utilization of the hypervisor 210 of the server 200 is smaller than the CPU utilization threshold (of, for example, 95%) registered in the virtual switch monitoring and setting table 111.

(2) The ratio of the amount of the communication between the virtual machines to the total amount of communication executed through the virtual switch 211 is smaller than the virtual switch load threshold (of, for example, 30%) registered in the virtual switch monitoring and setting table 111.

If the communication is to be returned, the process proceeds to step S36. If the communication is not to be returned, the process returns to step S31. When the process returns to step S31 or proceeds to step S36, the load determining unit 130 clears the details registered in the physical switch measurement table 114. As described later with reference to FIG. 14, the load determining unit 130 continuously acquires the average CPU utilization and the like based on the MIB information continuously acquired from the server 200 and causes the acquired average CPU utilization and the like to be stored in the storage unit 110.

In S36, the load determining unit 130 notifies the path controller 140 of the release of the offloading state. The path controller 140 instructs the server 200 and the switch 300 to release the offloading state. When receiving the instruction, the server 200 and the switch 300 release the offloading state.

In this manner, the control server 100 determines, based on the load and communication amount of the server 200, whether or not the offloading state is to be released. In step S35, the load determining unit 130 determines that the communication is to be returned if both requirements (1) and (2) are satisfied. However, the load determining unit 130 may determine that the communication is to be returned if any of the requirements (1) and (2) is satisfied. In this case, the load determining unit 130 determines that the communication is not to be returned if both requirements (1) and (2) are not satisfied. Next, the acquisition of the load and communication amount of the server 200 by the control server 100 is described.

Figure 14:
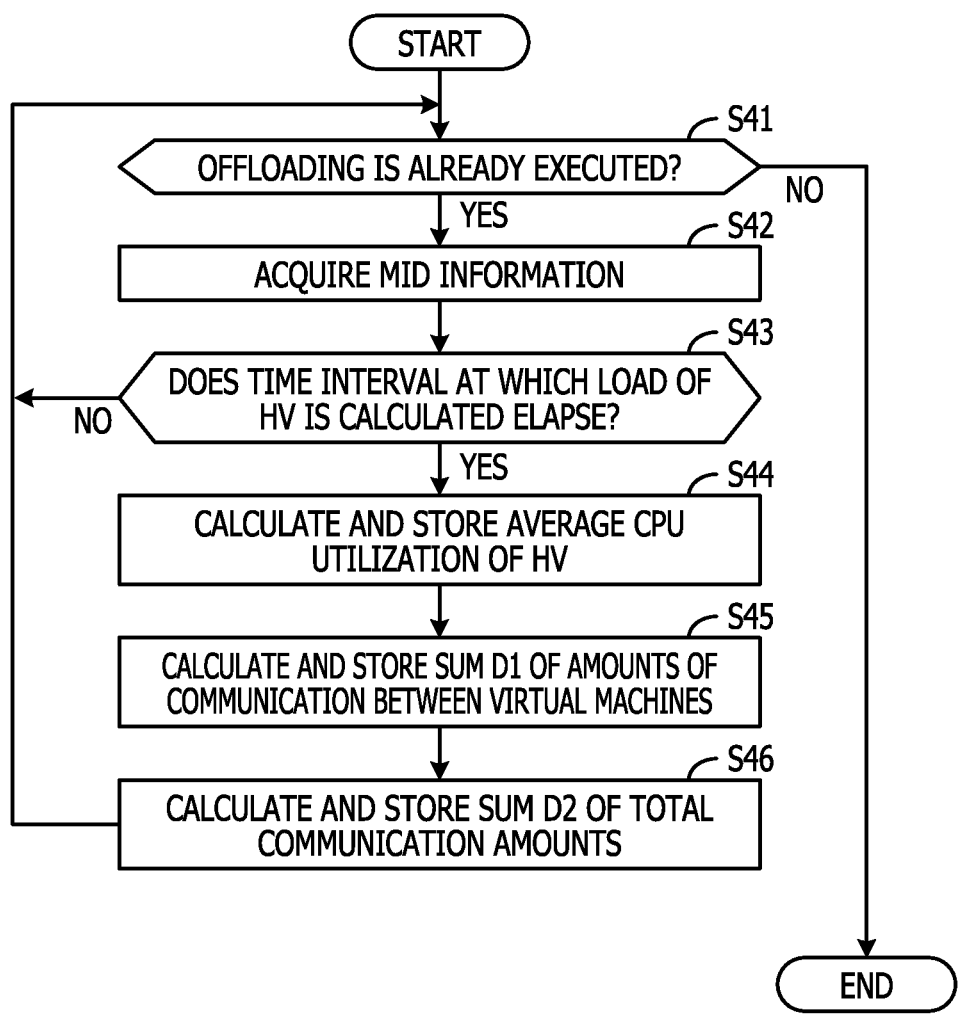
FIG. 14 is a flowchart of an example of a process of acquiring information of a server.

FIG. 14 is a flowchart of an example of a process of acquiring information of the server. Hereinafter, the process illustrated in FIG. 14 is described using step numbers.

In S41, the collector 120 determines whether or not the server 200 and the switch 300 are in the offloading state in which the offloading is executed. If the server 200 and the switch 300 are in the offloading state, the process proceeds to step S42. If the server 200 and the switch 300 are not in the offloading state, the process is terminated. A specific method for the determination is the same as step S21 illustrated in FIG. 12 (except for the fact that, in the process illustrated in FIG. 14, the following processes are executed if the server 200 and the switch 300 are in the offloading state).

In S42, the collector 120 acquires MIB information from the server 200. The MIB information acquired by the collector 120 includes the CPU utilization of the hypervisor 210, the amount of communication executed through the virtual switch 211 between the virtual machines, and the total amount of communication executed through the virtual switch 211. The collector 120 acquires the MIB information at intervals (of, for example, 30 seconds) registered in the virtual switch monitoring and setting table 111. The collector 120 registers the acquired information in the server measurement table 113 (the measurement number represents the first measurement if the measurement is executed immediately after the calculation of the load in step S44, and after that, the measurement number is incremented by 1 and registered).

In S43, the load determining unit 130 references the virtual switch monitoring and setting table 111 and determines whether or not a time that corresponds to the load calculation interval elapses after previous calculation of the load of the hypervisor 210 (or after the start of the acquisition of the MIB information from the server 200 if the calculation of the load of the hypervisor 210 is the first calculation). If the time that corresponds to the load calculation interval elapses, the process proceeds to step S44. If the time that corresponds to the load calculation interval does not elapse, the process returns to step S41. For example, according to the virtual switch monitoring and setting table 111, the load calculation interval is 300 seconds.

In S44, the load determining unit 130 references the server measurement table 113 and calculates average CPU utilization of the hypervisor 210. For example, since the 10 measured values are registered in the server measurement table 113, the value obtained by dividing the total of the measured values by 10 is the average CPU utilization of the hypervisor 210. The load determining unit 130 causes the calculated average CPU utilization to be stored in the storage unit 110 (it is sufficient if the latest value is maintained).

In S45, the load determining unit 130 references the server measurement table 113 and calculates the sum D1 of the amounts of the communication executed through the virtual switch 211 between the virtual machines. For example, since the 10 measured amounts of the communication between the virtual machines are registered in the server measurement table 113, the sum of the 10 measured amounts is the sum D1. The load determining unit 130 causes the calculated sum D1 to be stored in the storage unit 110 (it is sufficient if the latest value is maintained).

In S46, the load determining unit 130 references the server measurement table 113 and calculates the sum D2 of the total amounts of the communication executed through the virtual switch 211. For example, since 10 total communication amounts are registered in the server measurement table 113, the sum of the 10 measured total communication amounts is the sum D2. The load determining unit 130 causes the calculated sum D2 to be stored in the storage unit 110 (it is sufficient if the latest value is maintained). The load determining unit 130 clears the details registered in the server measurement table 113. Then, the process returns to step S41.

In this manner, the control server 100 continuously monitors the load and communication amount of the server 200. The information acquired in steps S44, S45, and S46 may be used in step S35 illustrated in FIG. 13. Specifically, the load determining unit 130 may determine whether or not the average CPU utilization is smaller than the CPU utilization threshold registered in the virtual switch monitoring and setting table 111. In addition, the load determining unit 130 may determine whether or not the ratio of D1 to D2 is smaller than the virtual switch load threshold registered in the virtual switch monitoring and setting table 111.

Immediately after the instruction to release the offloading state is provided (or immediately after step S36 illustrated in FIG. 13), the control server 100 may reset the details registered in the server measurement table 113, the details registered in the physical switch measurement table 114, and the timer values to be used for the monitoring.

Figure 15:
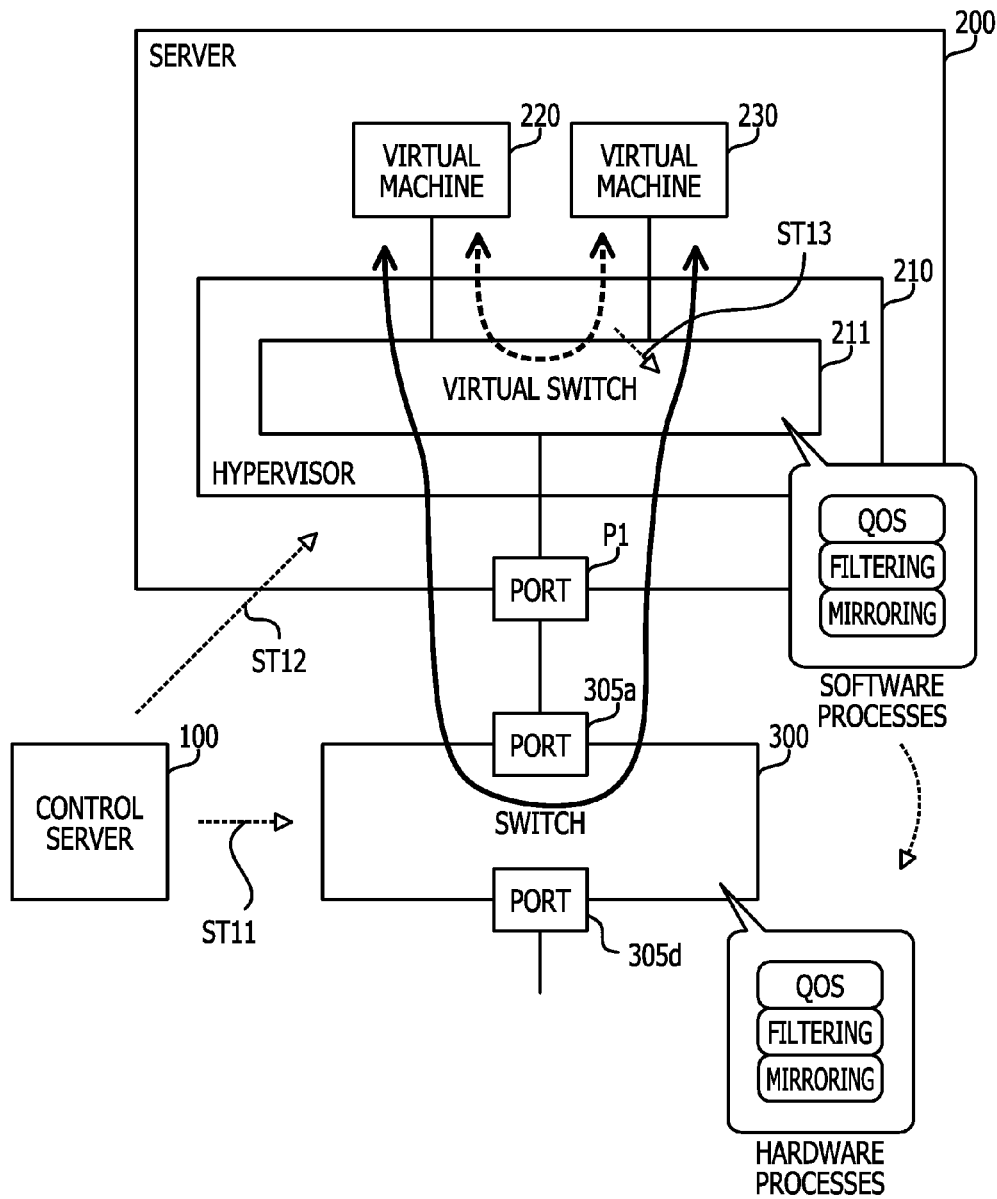
FIG. 15 is a diagram describing an example of offloading.

FIG. 15 is a diagram illustrating an example of the offloading. FIG. 15 describes a specific example of step S19 illustrated in FIG. 11. The example illustrated in FIG. 15 assumes that a physical port included in an NIC of the server 200 is a port P1 (the same applies hereinafter). In FIG. 15, an illustration of the virtual machine 240 is omitted. For example, the control server 100 instructs the switch 300 to prepare switching to an offload mode (in step ST11). The switch 300 prepares the switching to the offload mode in accordance with the instruction. Specifically, the switch 300 executes a setting operation so as to ensure that "a packet of which a destination is a virtual machine on the hypervisor 210 is returned to the server 200 having the hypervisor 210 executed thereon". The switch 300 may notifies the control server 100 of the completion of the preparation.

The control server 100 instructs the hypervisor 210 to switch to the offload mode (in step ST12). Specifically, the control server 100 instructs the hypervisor 210 to "transfer, to the switch 300, a packet of which a destination is a virtual machine on the hypervisor 210 (or to cause the packet to pass through the hypervisor 210 to the switch 300) when the hypervisor 210 receives the packet from another virtual machine". In addition, the control server 100 instructs the hypervisor 210 to "transfer a packet of which a destination is a virtual machine on the hypervisor 210 to the destination virtual machine when the hypervisor 210 receives the packet from the switch 300".

The hypervisor 210 changes settings of the virtual switch 211 in accordance with the instructions so as to enable communication to be executed between the virtual machines using the switch 300 (in step ST13). Thus, the processes executed by the software of the server 200, which are the data transfer, the QoS, the filtering, and the mirroring, are migrated to the switch 300 and executed by the hardware.

Figure 16:
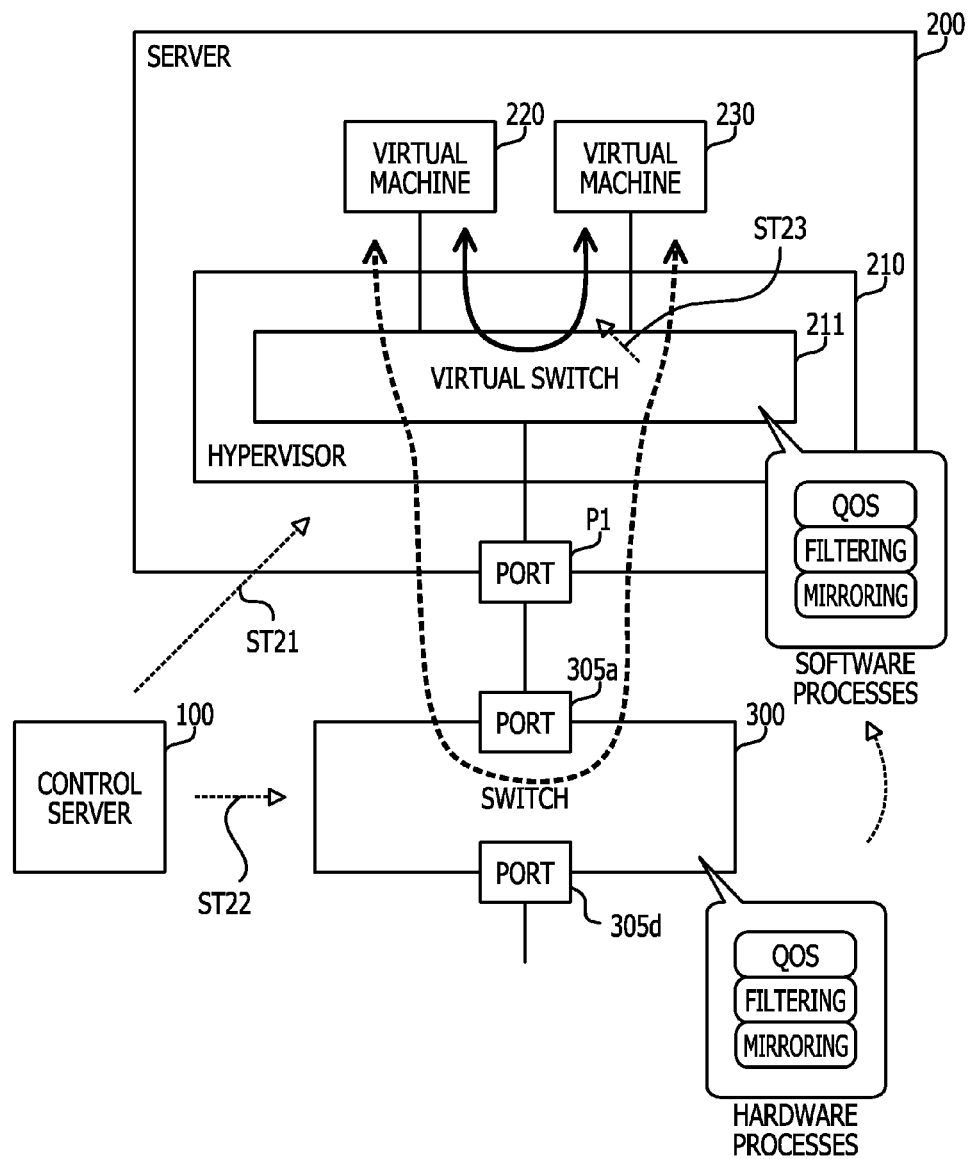
FIG. 16 is a diagram describing an example of the release of the offloading state.

FIG. 16 is a diagram illustrating an example of the release of the offloading state. FIG. 16 illustrates a specific example of step S36 illustrated in FIG. 13. In FIG. 16, an illustration of the virtual machine 240 is omitted. For example, the control server 100 instructs the hypervisor 210 to prepare switching from the offload mode to the original mode (non-offload mode) (in step ST21). The hypervisor 210 prepares the switching to the original mode in accordance with the instruction.

Specifically, the hypervisor 210 sets the virtual switch 211 so as to "inhibit a packet of which a destination is a virtual machine on the hypervisor 210 from being transferred toward the switch 300 and cause the packet to be returned within the virtual switch 211 and transferred to the destination virtual machine". The hypervisor 210 may notifies the control server 100 of the completion of the preparation.

Then, the control server 100 instructs the switch 300 to release the offload mode (in step ST22). Specifically, the control server 100 instructs the switch 300 to clear a setting that "causes a packet of which a destination is a virtual machine on the hypervisor 210 to be returned toward the server 200 having the hypervisor 210 executed thereon".

The switch 300 clears the setting of the switch 300 in accordance with the instruction. Thus, the release of the offload mode is completed (in step ST23). After that, the processes, which are the data transfer, the QoS, the filtering, the mirroring, and the like and executed by the hardware of the switch 300, are migrated to the virtual switch 211 and executed by the software of the virtual switch 211.

As described above, the control server 100 may acquire information to be used to estimate a process load of the virtual switch 211 and may switch the original mode to the offload mode based on the acquired information.

If a ratio of a load caused by the virtual switch 211 to a process load of the server 200 is relatively small, and the offloading is executed, the load of the server 200 may not be sufficiently reduced. In addition, if the load of the server 200 is high and the offloading is attempted to be executed, the load of the server 200 may further increase due to a process load caused by the offloading. In this case, if the load caused by the virtual switch 211 is relatively low, processing performance is highly likely to be improved by avoiding the execution of the offloading.

However, if the virtual switch 211 is included in the hypervisor 210, it is difficult to directly recognize the load caused by the virtual switch 211. For example, it is difficult to directly determine whether or not a ratio of any of loads caused by hypervisor 210 is caused by the processes of the virtual switch 211. In addition, even if the process load of the server 200 and the amount of communication executed by the server 200 are simply acquired and referenced, it is difficult to recognize the load caused by the virtual switch 211.

Thus, the control server 100 determines, based on a load, caused by the hypervisor 210, of the server 200, the amount of communication handled by the virtual switch 211, and the amount of communication between the server 200 and an external device, whether or not a load of the server 200 is caused by the virtual switch 211.

If the load, caused by the hypervisor 210, of the server 200 is relatively high, and the ratio of the amount of the communication between the virtual machines to the total amount of communication executed through the virtual switch 211 is large, the load of the server 200 may be estimated to be caused by the virtual switch 211. This is due to the fact that if the ratio of the amount of the communication between the virtual machines is relatively large, the frequencies of the processes to be offloaded from the virtual switch 211 or the frequencies of the data transfer, QoS, and the like may increase and thus the load of the server 200 may increase. In this case, if the load, caused by the hypervisor 210, of the server 200 is relatively high, the high load of the server 200 is highly likely to be caused by the processes of the virtual switch 211. In this case, the load of the server 200 is highly likely to be reduced by the offloading.

In this manner, the control server 100 determines whether or not the process load of the server 200 is caused by the virtual switch 211, and the control server 100 may thereby appropriately determine whether or not the offloading is to be executed. As described above, the control server 100 may acquire, from the server 200, the amount of communication executed through the virtual switch 211 between an external device and the virtual machines in order to acquire the total amount of communication executed through the virtual switch 211. In this case, the collector 120 may acquire the total communication amount by summing the amount of the communication between the virtual machines and the amount of the communication between the external device and the virtual machines (or between the external device and the server 200).

The control server 100 determines the loads based on an average of loads calculated at the load calculation intervals registered in the virtual switch monitoring and setting table 111 and an average of loads calculated at the load calculation intervals registered in the physical switch monitoring and setting table 112. In addition, the control server 100 determines the ratio of the amount of communication between the virtual machines based on a total of communication amounts calculated at the load calculation intervals. Thus, the execution of the mode switching due to an instantaneous increase in a load or an instantaneous increase in the amount of communication may be suppressed, for example. In addition, the frequent execution of the mode switching due to an instantaneous increase in a load or an instantaneous increase in the amount of communication may be suppressed.

The control server 100 executes the offloading if the load, caused by the hypervisor 210, of the server 200 is equal to or higher than the threshold registered in the virtual switch monitoring and setting table 111. Thus, the execution of the offloading when a resource of the server 200 is available is suppressed.

The control server 100 determines, based on the load of the switch 300, whether or not the offloading is to be executed. Thus, if the load of the switch 300 is relatively high, the execution of the offloading may be suppressed.

Thus, a risk of overloading the switch 300 and reducing the communication performance may be reduced.

Even after the execution of the offloading, the control server 100 continuously monitors the load of the server 200, the load of the switch 300, and the communication amounts and determines, based on results of the monitoring, whether or not the offloading state is to be released. This is due to the fact that if the load of the switch 300 increases and the load of the server 200 is reduced after the offloading, the performance is likely to be improved by releasing the offloading state. If the ratio of the amount of communication between the virtual machines to the amount of communication executed through the virtual switch 211 is relatively small, and the communication between the virtual machines is returned to the virtual switch 211, an increase in the load, caused by the virtual switch 211, of the server 200 may be suppressed to a relatively low level.

The control server 100 uses SNMP to acquire, from the server 200 and the switch 300, information of the load of the server 200, the load of the switch 300, and communication amounts. Thus, the control server 100 may use a common protocol to efficiently collect information from both server 200 and switch 300. Especially, SNMP is generally used as a protocol for collection of information for operations and management, and there are many types of physical switches that support SNMP. Thus, the system has an advantage in that the functions of the control server 100 may be achieved using information acquired from the switch 300 through SNMP.

Figure 17:
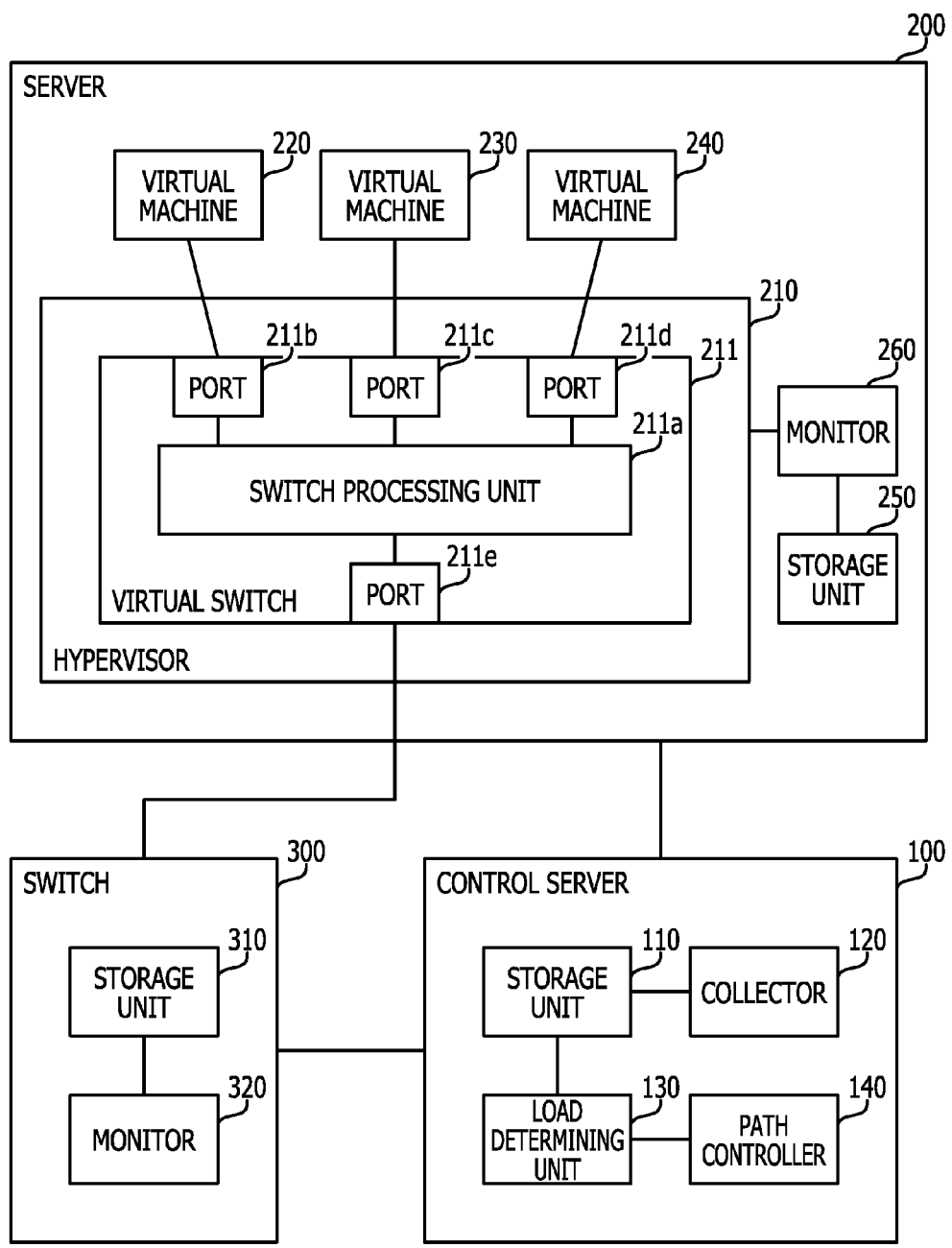
FIG. 17 is a diagram illustrating another example of software of the devices.

FIG. 17 is a diagram illustrating another example of software of the devices. The example illustrated in FIG. 17 is different from the example illustrated in FIG. 5 in that the server 200 includes a monitor 260 instead of the monitor 212. For example, the monitor 260 is a dedicated communication library to be used to enable applications executed on the virtual machines 220, 230, and 240 to communicate with the other virtual machines on the server 200 or an external device arranged outside the server 200. In this case, the applications executed on the virtual machines 220, 230, and 240 use the communication library upon communication.

The monitor 260 acquires the CPU utilization of the hypervisor 210. For example, if the hypervisor 210 is virtualization software called Xen, the monitor 260 may acquire the CPU utilization from a result of the execution of xm top command in Domain0.

The monitor 260 acquires the amount of communication between the virtual machines on the server 200. For example, if communication data includes identifiers of virtual machines on the server 200 as a source of the communication data and a destination of the communication data, the communication is executed between the virtual machines. In addition, the monitor 260 acquires the amount of communication from the virtual machines 220, 230, and 240 to an external device arranged outside the server 200 or acquires the amount of communication from the external device arranged outside the server 200 to the virtual machines 220, 230, and 240. For example, if a source of communication data or a destination of the communication data is the external device arranged outside the server 200 (is, for example, an identifier other than identifiers of the virtual machines on the server 200), communication from the server 200 to the external device arranged outside the server 200 or from the external device arranged outside the server 200 to the server 200 is executed.

The monitor 260 provides the acquired communication amounts to the control server 100. In this case, the monitor 260 may separately provide the acquired communication amounts to the control server 100. In addition, the monitor 260 may provide, to the control server 100, the amount (1) of communication between the virtual machines on the server 200 and a sum (2) of the amount of the communication between the virtual machines on the server 200 and the amount of communication between the server 200 and the external device arranged outside the server 200.

In the former method, the sum (2) of the amounts of the communication is obtained by causing the control server 100 (for example, the collector 120) to sum the acquired communication amounts. As a method for calculating a load and a method for determining whether or not the switching of the offload mode is to be executed, procedures that are the same as the procedures illustrated in FIGS. 11 to 14 may be used. Thus, since the monitor 260 is installed outside the hypervisor 210, the hypervisor 210 may not be modified. Thus, the functions of the control server 100 according to the second embodiment may be achieved in a simple manner.

FIGS. 18A and 18B are diagrams illustrating first and second examples of information to be acquired. FIG. 18A illustrates the first example of the information to be acquired by the control server 100 from the server 200, while FIG. 18B illustrates the second example of the information to be acquired by the control server 100 from the server 200.

FIGS. 18A and 18B both illustrate a case where the control server 100 acquires, as items of the information to be acquired, the load of the server 200, the amount of communication handled by the virtual switch, and the amount of communication between the server 200 and an external device. In both examples illustrated in FIGS. 18A and 18B, the control server 100 acquires, as the load of the server 200, a load, caused by the hypervisor 210, of the server 200 and acquires, as the amount of the communication handled by the virtual switch 211, the amount of the communication between the virtual machines.

The control server 100 may acquire, as the amount of the communication between the server 200 and the external device, MIB information of the amount of the communication executed through the virtual switch 211 between the server 200 and the external device (in the example illustrated in FIG. 18A). Alternatively, the control server 100 may acquire, as the amount of the communication between the server 200 and the external device, MIB information of a total amount of communication executed through the virtual switch 211 (in the example illustrated in FIG. 18B).

This is due to the fact that the control server 100 indirectly obtains a communication amount corresponding to the amount of the communication between the server 200 and the external device by subtracting the amount of the communication between the virtual machines from the total communication amount. In this case, a combination of the amount of the communication executed through the virtual switch 211 between the virtual machines and the total amount of the communication executed through the virtual switch 211 may be treated as information that represents the amount of the communication between the server 200 and the external device.

As described above, the information to be acquired by the control server 100 may be of various types. As an example other than the examples illustrated in FIGS. 18A and 18B, the control server 100 may acquire, as the load of the server 200, the CPU utilization of the server 200, memory utilization of the server 200, or the like. In addition, the control server 100 may acquire, as the amount of the communication between the server 200 and the external device, the amount of communication between the server 200 and the external device through the physical NIC included in the server 200. Furthermore, the functions of the control server 100 may be achieved by the server 200.

The information processing according to the first embodiment may achieved by causing the processor included in the control device 1 (for example, the computer) to execute a program. In addition, the information processing according to the second embodiment may be achieved by causing the processor 101 to execute the program. The program may be stored in a computer-readable recording medium (for example, the optical disc 13, the memory device 14, the memory card 16 and the like).

For example, the program may be distributed by distributing the recording medium storing the program. In addition, the program may be stored in another computer and distributed through a network. The computer may cause the program stored in the recording medium or received from the other computer to be stored (installed) in a storage device such as the RAM 102, the HDD 103, or the like, and may read the program from the storage device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium including a program, which when executed by a computer, causes the computer to execute a process, the computer being coupled to an information processing device and a physical switch, the information processing device including a processor, the processor working as a virtual switch, the process comprising:
   obtaining first information indicating a utilization ratio of the processor by the virtual switch, second information indicating a first amount of communication handled by the virtual switch, and third information indicating a second amount of communication between the information processing device and another information processing device via the physical switch; and
   determining to switch from a first mode in which the virtual switch executes a switch operation to a second mode in which the virtual switch and the physical switch cooperatively execute the switch operation when a load of a hypervisor is equal to or more than a first threshold and a percentage of the first amount of communication to a sum of the first amount of communication and the second amount of communication is equal to or more than a second threshold, and determining not to switch from the first mode to the second mode when the load of the hypervisor is less than the first threshold and the percentage is less than the second threshold.

2. The non-transitory computer-readable medium of claim 1, wherein
   the utilization ratio of the processor is a load of a hypervisor that executes the virtual switch.

3. The non-transitory computer-readable medium of claim 1, wherein
   the process further comprises:
   transmitting a request complying with simple network management protocol; and
   receiving information of message information base as a response of the request to obtain the first information, the second information and the third information.

4. The non-transitory computer-readable medium of claim 1, wherein
   the process further comprises:
   updating the first information, the second information and the third information after switching from the first mode to the second mode; and
   determining whether to switch from the second mode to the first mode on the basis of the updated first information, the updated second information and the updated third information.

5. The non-transitory computer-readable medium of claim 1, wherein
   the process further comprises:
   obtaining fourth information indicating a load of the physical switch,
   wherein the determining includes determining to switch from the first mode to the second mode on the basis of the fourth information in addition to the first information, the second information and the third information.

6. The non-transitory computer-readable medium of claim 5, wherein
   the determining includes determining to switch from the first mode to the second mode when the load of the physical switch is equal to or less than a third threshold, and determining not to switch from the first mode to the second mode when the load of the physical switch is more than the third threshold.

7. The non-transitory computer-readable medium of claim 1, wherein
   the first amount of communication is an amount of communication between a plurality of virtual machines which are executed in the computer.

8. An apparatus controlling an information processing device coupled to a physical switch, the information processing device including a first processor, the first processor working as a virtual switch, the apparatus comprising:
   a memory; and
   a second processor coupled to the memory and configured to:
   obtaining first information indicating a utilization ratio of the first processor by the virtual switch, second information indicating a first amount of communication handled by the virtual switch, and third information indicating a second amount of communication between the information processing device and another information processing device via the physical switch; and
   determining to switch from a first mode in which the virtual machine executes a switch operation to a second mode in which the virtual switch and the physical switch cooperatively execute the switch operation when a load of a hypervisor is equal to or more than a first threshold and a percentage of the first amount of communication to a sum of the first amount of communication and the second amount of communication is equal to or more than a second threshold, and determining not to switch from the first mode to the second mode when the load of the hypervisor is less than the first threshold and the percentage is less than the second threshold.

9. A method, executed by a processor, of controlling an information processing device coupled to a physical switch, the information processing device including a processor, the processor working as a virtual switch, the method comprising:

obtaining first information indicating a utilization ratio of the processor by the virtual switch, second information indicating a first amount of communication handled by the virtual switch, and third information indicating a second amount of communication between the information processing device and another information processing device via the physical switch; and determining to switch from a first mode in which the virtual switch executes a switch operation to a second mode in which the virtual switch and a physical switch cooperatively execute the switch operation when a load of a hypervisor is equal to or more than a first threshold and a percentage of the first amount of communication to a sum of the first amount of communication and the second amount of communication is equal to or more than a second threshold, and determining not to switch from the first mode to the second mode when the load of the hypervisor is less than the first threshold and the percentage is less than the second threshold.

* * * * *